United States Patent
Qi et al.

(10) Patent No.: US 9,621,204 B2
(45) Date of Patent: Apr. 11, 2017

(54) APPARATUS AND METHOD FOR BURST SIGNAL DETECTION

(71) Applicant: VT IDIRECT, INC., Herndon, VA (US)

(72) Inventors: Ronggang Qi, Broadlands, VA (US); Sahana Raghunandan, Fairfax, VA (US)

(73) Assignee: VT IDIRECT, INC., Herndon, VA (US)

(*) Notice: Subject to any disclaimer, the term of this patent is extended or adjusted under 35 U.S.C. 154(b) by 0 days.

(21) Appl. No.: 15/081,505

(22) Filed: Mar. 25, 2016

(65) Prior Publication Data

US 2016/0285659 A1 Sep. 29, 2016

Related U.S. Application Data

(60) Provisional application No. 62/138,843, filed on Mar. 26, 2015.

(51) Int. Cl.
*H04B 1/10* (2006.01)
*H04B 1/7075* (2011.01)
(Continued)

(52) U.S. Cl.
CPC .......... *H04B 1/10* (2013.01); *H04B 1/709* (2013.01); *H04B 1/7077* (2013.01);
(Continued)

(58) Field of Classification Search
CPC ........ H04B 1/69; H04B 1/707; H04B 1/7075; H04B 1/70751; H04B 1/70752; H04B 1/70754; H04B 1/7077; H04B 1/7085; H04B 1/709; H04B 1/7095; H04B 2001/6904; H04B 2001/6908; H04B 2001/70706; H04B 2001/70724; H04B 7/2046; H04B 7/2048; H04B 7/2656; H04B 7/2659; H04B 1/10; H04B 7/0041; H04L 27/22; H04L 27/227; H04L 27/2275; H04L 27/2276; H04L 27/2278; H04L 27/2647; H04L 27/2649; H04L 27/2656; H04L 27/2663; H04L 25/021; H04L 25/0228; H04L 27/0014
(Continued)

(56) References Cited

U.S. PATENT DOCUMENTS 5,982,763 A * 11/1999 Sato ............... H04B 1/70757
370/335
6,370,397 B1 * 4/2002 Popovic ............ G01S 5/0215
370/342

(Continued)

*Primary Examiner* — Young T Tse
(74) *Attorney, Agent, or Firm* — Oblon, McClelland, Maier & Neustadt, L.L.P.

(57) ABSTRACT

An apparatus and method for detecting a burst signal. The apparatus includes circuitry that concatenates a predetermined number of samples and transmits the samples to a first programmable memory tap of a predetermined number of programmable memory taps. For each memory tap, a corresponding partial correlation is computed. A normalized sum of all the partial correlations is multiplexed and transmitted to a predetermined number of multipliers. A peak of the burst signal is determined by computing a summation of the complex multiplications of each multiplier, wherein the determined peak corresponds to a start of the burst signal.

20 Claims, 21 Drawing Sheets

(51) Int. Cl.
| | |
|---|---|
| *H04B 1/7077* | (2011.01) |
| *H04B 1/709* | (2011.01) |
| *H04B 7/00* | (2006.01) |
| *H04B 7/204* | (2006.01) |
| *H04B 7/26* | (2006.01) |
| *H04L 25/02* | (2006.01) |
| *H04L 27/00* | (2006.01) |
| *H04L 27/227* | (2006.01) |
| *H04L 7/00* | (2006.01) |

(52) U.S. Cl.
CPC ....... *H04B 1/70752* (2013.01); *H04B 7/2048* (2013.01); *H04B 7/2656* (2013.01); *H04L 7/0041* (2013.01); *H04L 25/021* (2013.01); *H04L 25/0228* (2013.01); *H04L 27/0014* (2013.01); *H04L 27/2278* (2013.01)

(58) Field of Classification Search
USPC ....... 375/130, 134, 137, 142, 145, 149, 150, 375/343, 355; 370/321, 337, 347, 349, 370/350
See application file for complete search history.

(56) References Cited

U.S. PATENT DOCUMENTS

| | | | | |
|---|---|---|---|---|
| 2001/0030990 | A1* | 10/2001 | Rouphael | H04B 1/707 375/142 |
| 2006/0215778 | A1* | 9/2006 | Murthy | G06F 1/0353 375/260 |
| 2009/0185646 | A1* | 7/2009 | Jo | H04L 27/2659 375/343 |

\* cited by examiner

Fig. 4B ant_of\_priority to provisional U.S. Application No. 62/138,843,

APPARATUS AND METHOD FOR BURST SIGNAL DETECTION

CROSS-REFERENCE TO RELATED APPLICATIONS

This application is based upon and claims the benefit of priority to provisional U.S. Application No. 62/138,843, filed Mar. 26, 2015, the entire contents of which are incorporated herein by reference.

BACKGROUND

Field of Disclosure

The present disclosure relates generally to a technique of acquiring a burst of TDMA signals in a reliable manner, while maintaining a low signal to noise ratio.

Description of Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Time-division-multiple-access (TDMA) schemes have been widely used in very small aperture terminal (VSAT) satellite systems. In such VSAT systems, a number of remote terminals utilize the TDMA channel to share satellite resources in time. The ever increasing need for communications on the move (COTM) applications in satellite communication systems enforces the system's operating signal to noise ratio (SNR) to be in the sub-zero decibel (dB) region. For instance, in some VSAT applications, TDMA receivers are required to operate at a channel SNR as low as −10 dB.

Generally, burst detection methods rely on a correlation between the received burst or frame signal, which usually begins with a sequence of a known data pattern (called a preamble) followed by payload data, and a local copy of the known data pattern. Very often, Constant False Alarm Ratio (CFAR) detection techniques are employed for reliable burst detection when using such a correlation based method. However, such a correlation based detection method may disadvantageously require carrier synchronization between the transmitter and the receiver. For instance, in the case of having a central hub and remote terminals, if the terminals are not synchronized to the hub, the correlation performance may degrade which in turn may adversely affect the signal detection performance.

In order to detect TDMA bursts at low SNR, one option is to increase the preamble length. However, in order to reduce the correlation degradation due to frequency error, a short data sequence may be preferred. Such conflicting requirements may prevent the use of the above described correlation based burst detection methods in detecting signal bursts at very low SNR.

SUMMARY

The present disclosure provides for a mechanism to acquire, in a reliable manner, signal bursts in TDMA systems. Specifically, the present disclosure provides a framework for reliable acquisition of TDMA bursts in the presence of large frequency errors, while maintaining a low signal to noise ratio (SNR). Furthermore, for spectral efficiency purposes, the acquisition burst length is kept as short as possible to operate the TDMA system at a carrier to noise ratio (C/N) of −10 decibels. The burst includes information regarding the remote transmitting entity as well as information pertaining to the conditions of the transmission channel. The burst provisions for the retrieval of fundamental information of the remote entity (terminal) at low SNR, and can tolerate a frequency error up to 3% of the chip rate.

An aspect of the present disclosure provides for a device for detecting a burst signal, the device including circuitry configured to: concatenate a predetermined number of samples and transmit the concatenated samples at a predetermined transmit rate to a first memory tap of a predetermined number of memory taps, each memory tap being programmable to delay each sample by an amount based on a length of a pilot-block of the burst signal and a length of a payload of the burst signal, compute, for each memory tap of the predetermined number of memory taps a corresponding partial correlation, the partial correlation for each memory tap including multiplying each of the concatenated samples with a corresponding pilot symbol included in a pilot block associated with the memory tap, the samples being transferred from the first memory tap to a subsequent memory tap after a time delay, compute for each memory tap, a sum of the partial correlations corresponding to every sample of the burst signal, normalize, for each memory tap, the computed sum of partial correlations, multiplex, the normalized partial correlations of the memory taps to a predetermined number of multipliers, each multiplier calculating a complex conjugate multiplication of a pair of neighboring samples, and determine a peak of the burst signal by computing a summation of the complex multiplications of each multiplier, the determined peak corresponding to a start of the burst signal.

According to an embodiment of the present disclosure is provided a method of detecting a burst signal, the method being performed by circuitry and including: concatenating a predetermined number of samples and transmit the concatenated samples at a predetermined transmit rate to a first memory tap of a predetermined number of memory taps, each memory tap being programmable to delay each sample by an amount based on a length of a pilot-block of the burst signal and a length of a payload of the burst signal, computing by circuitry, for each memory tap of the predetermined number of memory taps a corresponding partial correlation, the partial correlation for each memory tap including multiplying each of the concatenated samples with a corresponding pilot symbol included in a pilot block associated with the memory tap, the samples being transferred from the first memory tap to a subsequent memory tap after a time delay, computing for each memory tap, a sum of the partial correlations corresponding to every sample of the burst signal, normalizing by circuitry, for each memory tap, the computed sum of partial correlations, multiplexing the normalized partial correlations of the memory taps to a predetermined number of multipliers, each multiplier calculating a complex conjugate multiplication of a pair of neighboring samples, and determining a peak of the burst signal by computing a summation of the complex multiplications of each multiplier, the determined peak corresponding to a start of the burst signal.

According to an embodiment of the present disclosure is provided a non-transitory computer readable medium having stored thereon a program that when executed by a computer, causes the computer to execute a method of detecting a burst signal, the method including: concatenating a predetermined number of samples and transmit the concatenated samples at a predetermined transmit rate to a first memory tap of a predetermined number of memory taps, each memory tap being programmable to delay each sample by an amount based on a length of a pilot-block of the burst signal and a length of a payload of the burst signal, computing, for each memory tap of the predetermined number of memory taps a corresponding partial correlation, the partial correlation for each memory tap including multiplying each of the concatenated samples with a corresponding pilot symbol included in a pilot block associated with the memory tap, the samples being transferred from the first memory tap to a subsequent memory tap after a time delay, computing for each memory tap, a sum of the partial correlations corresponding to every sample of the burst signal, normalizing, for each memory tap, the computed sum of partial correlations, multiplexing the normalized partial correlations of the memory taps to a predetermined number of multipliers, each multiplier calculating a complex conjugate multiplication of a pair of neighboring samples, and determining a peak of the burst signal by computing a summation of the complex multiplications of each multiplier, the determined peak corresponding to a start of the burst signal.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein:

FIG. 4B depicts an exemplary master PN sequence used for pilot-block generation;

DETAILED DESCRIPTION OF EMBODIMENTS

Figure 1:
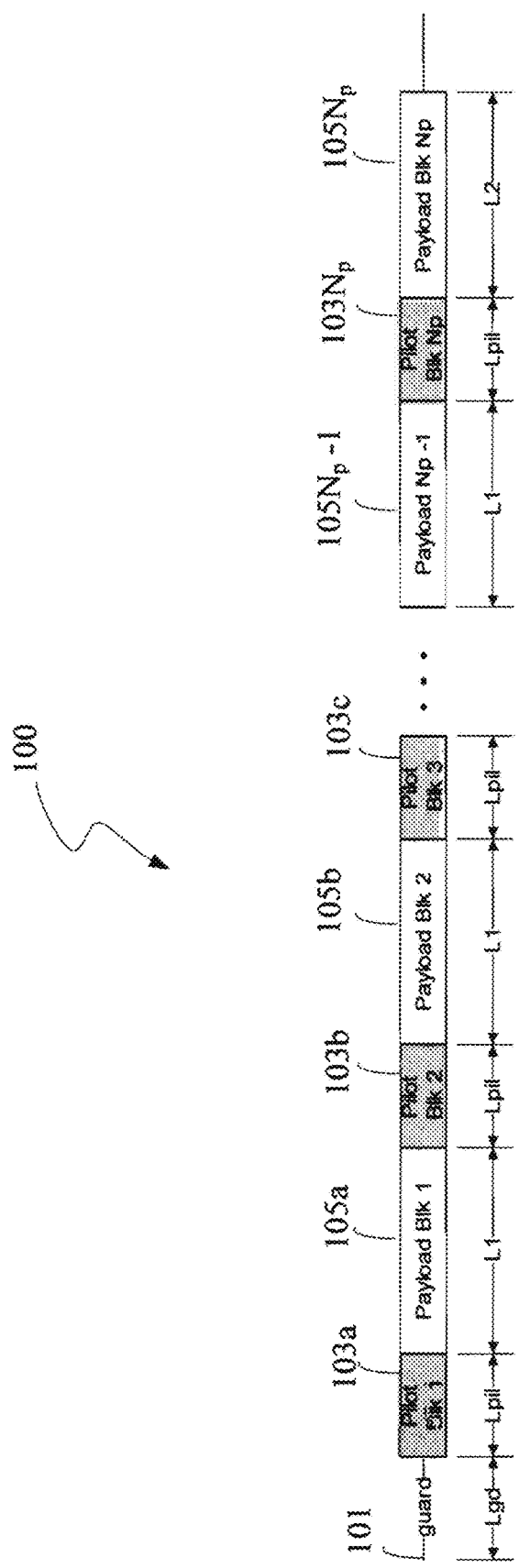
FIG. 1 depicts an exemplary format of a spread spectrum (SS)-TDMA burst signal.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range is encompassed within the present disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

In light of problems with conventional system noted above, there is a requirement for a framework which provisions for the acquisition of TDMA bursts in a reliable manner, even in the presence of large frequency errors, while maintaining a low signal to noise ratio.

A time-division-multiple-access (TDMA) system requires acquisition (ACQ) signaling for remote terminals to acquire the resources of the communication network. Specifically, before joining the network a remote terminal may not be synchronized to a hub receiver in both time and frequency. In order to initiate the network acquisition process, the remote terminal transmits an ACQ burst at a predetermined frequency in a given time window, referred to herein as an aperture time window. The ACQ burst is usually short in time duration and carries information about the remote terminal such as remote ID, waveform properties, Tx power, and the like. At the hub side, the hub receiver is required to reliably retrieve the information bits embedded in ACQ bursts. Moreover, the hub receiver also estimates the channel conditions via ACQ bursts, and further instructs the remote terminal to adjust its initial transmitting (Tx) power accordingly.

By one embodiment, in order to detect ACQ bursts at very low SNRs and in presence of frequency errors, a sufficiently long known data sequence may be inserted in the burst. As described with reference to FIG. 1, instead of using a single preamble, the known data sequence can be split into a number of smaller sections (referred to herein as pilot-blocks) of equal-length and evenly distribute them across the burst. In doing so, phase rotation due to a frequency error across a pilot block can be significantly reduced.

A key feature of demodulating a TDMA signal is carrier synchronization. The better a demodulator is at estimating the exact frequency offset, phase drift, and timing of an incoming transmission, the lower is the likelihood that the demodulator will introduce errors when decoding the transmission. Carrier synchronization may be more important in the demodulation of higher order modulations, like 8PSK, where synchronization impairments can significantly degrade a receiver's performance.

A typical TDMA burst commences with a preamble followed by a data payload. The preamble is a unique pattern of bits that is recognized by the demodulator, and allows the demodulator to estimate the symbol frequency and timing offsets of the incoming signal. However, placing all the unique symbols in the front of each burst does not provide the most effective means to measure symbol frequency, and moreover, is particularly ineffective for tracking frequency drifts. In order to overcome the above stated drawbacks, signal demodulators typically utilize more power to ensure error-free detection.

In a spread spectrum communication system, the individual data bits are modulated with a code sequence, referred to herein as a spreading code sequence. The individual bits in the spreading code sequence are referred to herein as 'chips'. Specifically, by one embodiment, a chip may be a pulse of a direct-sequence spread spectrum (DSSS) code, such as a Pseudo-random Noise (PN) code sequence that is used in direct-sequence code division multiple access (CDMA) channel access techniques. In contrast, in a binary direct-sequence system, each chip is a rectangular pulse of +1 or −1 amplitude, which is multiplied by a data sequence (similarly +1 or −1 representing the message bits) and by a carrier waveform to generate the transmitted signal. Accordingly, the chips can be envisioned as the bit sequence output from a code generator. It must be appreciated that the chip rate of a code is the number of pulses per second (chips per second) at which the code is transmitted (or received). Accordingly, the chip rate may be larger than the symbol rate, wherein a ratio of the chip rate to the symbol rate is referred to herein as a 'spreading factor'.

Accordingly, by one embodiment of the present disclosure, distributed pilots are introduced in the burst structure of a TDMA signal. FIG. 1 depicts an exemplary format 100 of a spread spectrum time division multiple access (SS-TDMA) burst signal. The burst structure 100 includes small blocks of known symbols 103a-103N$_p$ (referred to herein as pilot-blocks), which are placed at certain symbol intervals throughout the burst structure 100. Distributing pilots throughout the entire burst, increases the frequency estimation accuracy, and also enables the tracking of frequency drifts that are common in low rate carriers and mobile applications. As shown in FIG. 1, the burst signal includes a plurality of data payload blocks 105a-105N$_p$, each of which is preceded by a corresponding pilot-block. Further, the burst signal 100 includes a guard band 101 that separates the burst structure 100 from a preceding burst structure.

In FIG. 1, the lengths (in terms of number of chips) depicted as Lgd, Lpil (also denoted to herein as L$_p$), L1, and L2 correspond to the guard time length, pilot-block length, regular payload block length, and the last payload block length, respectively. As will be described later, the frequency error tolerance range is determined by the distance between pilot blocks. Additionally, the acquisition of the spread spectrum TDMA burst signal is referred to herein as the SS-ACQ waveform.

The frequency error tolerance range for SS-TDMA waveform as depicted in FIG. 1 is determined by the distance between pilot blocks. Specifically, the maximum tolerated frequency error is given by:

$$f_{err,max} = \frac{1}{2 \cdot (L_{pil} + L_1)} = \frac{1}{2 \cdot N_{dist}} \tag{1}$$

An SS-TDMA waveform burst starts with a pilot block and all pilot blocks are uniformly distributed in the payload. By one embodiment, the distance of pilot blocks should be close enough so that the phase drift caused by the maximum frequency error (+/−1.5% of symbol rate) over N$_{dist}$ (N$_{dist}$=L$_{pil}$+L$_1$) chips does not exceed 180 degrees.

Figure 2:
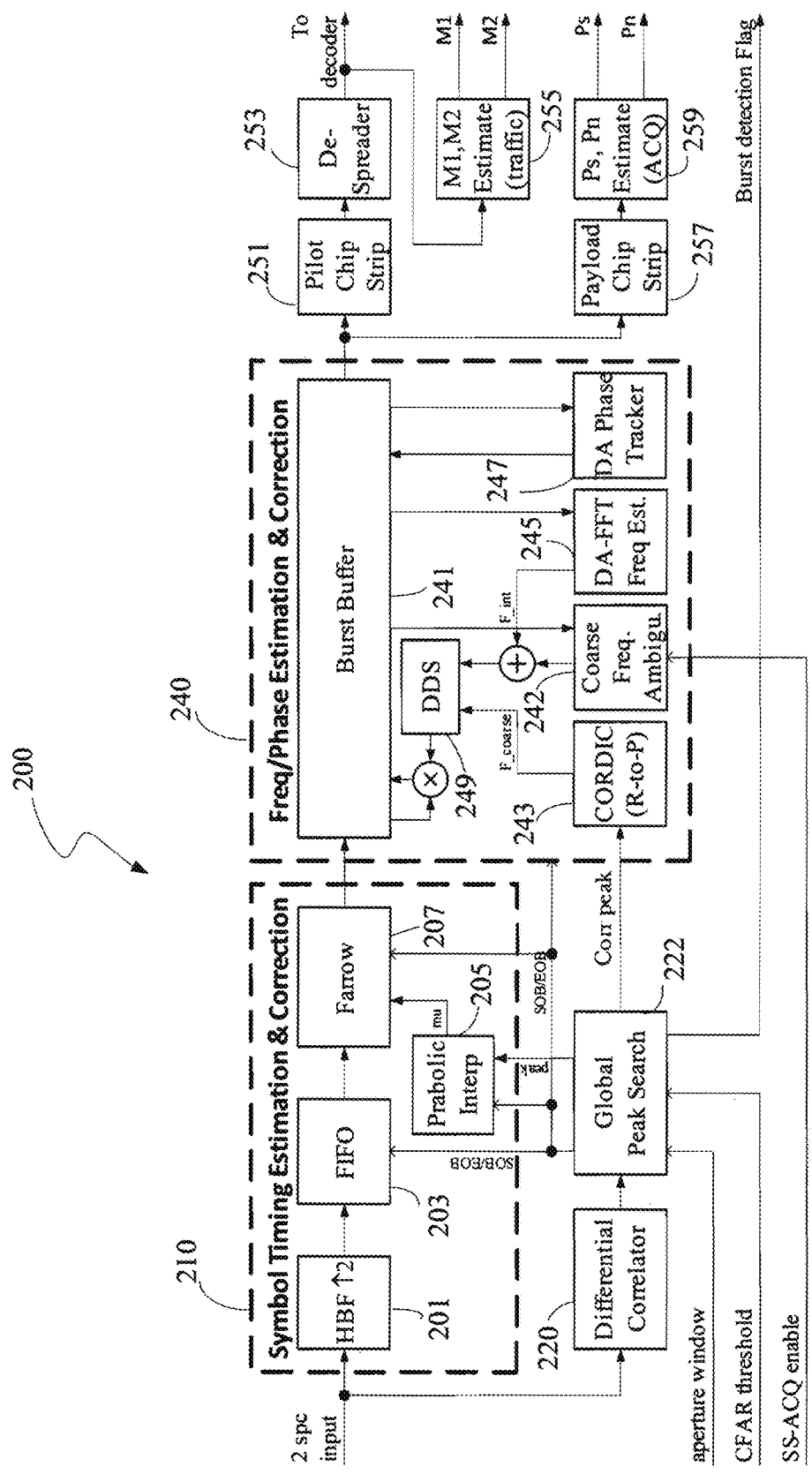
FIG. 2 illustrates by one embodiment, an exemplary block diagram of a burst signal demodulator.

FIG. 2 illustrates according to an embodiment, an exemplary block diagram of a SS-TDMA waveform demodulator 200. The demodulator 200 includes a symbol timing estimation and correction processing circuit 210, and a frequency phase estimation and correction processing circuit 240. The SS-TDMA burst signal sampled at a predetermined sampling rate (e.g., sampling rate of 2 samples per chip (spc)) is input into the demodulator. The input samples are input to the symbol timing estimation and correction module 210 as well as input to the differential correlator 220 in a parallel fashion.

The symbol timing estimation and correction module 210 includes a half band filter (HBF) 201 that is employed to up-sample the input, for instance, up-sample the input to 4 samples per chip in order to meet the requirement of symbol timing estimation and correction. The differential correlator 220 calculates the differential correlation between the incoming two samples per chip burst signal with a local copy of the pilot-blocks. The demodulator 200 also includes a global peak search 222 that determines a highest correlation peak within the aperture window and compares the peak with a detection threshold. By one embodiment, a burst is detected based on the detected peak being above the threshold. The global peak search 222 also generates a coarse frequency error estimate from the correlation peak. Details regarding the differential correlator 220 and the global peak search 222 are described later with reference to FIG. 3.

According to one embodiment of the present disclosure, the FIFO 203 in the symbol timing estimation module 210 aligns the first burst sample of the HBF interpolator output with the Start-of-Burst strobe generated by the global peak search block 222. The Parabolic Interpolator 205 calculates a symbol timing error (mu) based on the correlation peak (computed by the global peak search 222) along with its two immediate adjacent values. The Farrow filter 207 thereafter corrects the symbol timing error according to the estimated 'mu'. The output of the Farrow filter 207 is sampled at 1 sample per chip and stored in the burst buffer 241.

According to one embodiment of the present disclosure, a correlation peak based chip timing estimator is used for SS-TDMA to avoid large estimation variance that may be encountered by a traditional filter-and-square (F&S) filter at low SNR. The correlation peak based chip timing estimation performs parabolic interpolation using the correlation peak and its two immediate adjacent values to calculate an interpolated peak value and its location offset (a fractional sample period from the original peak location).

Let (D2, C2) be the correlation peak location (sample index) and the peak value. Its immediate left and right correlation location/value can be denoted by (D1, C1)=(D2−1, C1) and (D3, C3)=(D2+1, C3), respectively. The chip timing error (mu) relative to D2 is $$\mu_0 = -\frac{C3 - C1}{2(C3 + C1 - 2C2)} \quad (2)$$

In order to avoid missing of a half chip at the beginning of the burst when $\mu_0$ is negative, the selection of the final peak location index ($D_{int}$) is:

$$D_{int} = \begin{cases} D2, & \text{if } \mu_0 \geq 0 \\ D1, & \text{if } \mu_0 < 0 \end{cases} \quad (3)$$

Accordingly, the final mu value is also accordingly adjusted as:

$$\mu = \begin{cases} \mu_0, & \text{if } \mu_0 \geq 0 \\ 1 + \mu_0, & \text{if } \mu_0 < 0 \end{cases} \quad (4)$$

The burst buffer 241 included in the frequency estimation module 240 initially stores 1-sample-per-chip signal that is input from the farrow filter 207. The sample is read and written sequentially by the coarse frequency error ambiguity module 242, the data-aided fast Fourier transform module 245, the data aided phase tracker 247 and the rectangular to polar coordinate rotation digital compute (CORDIC) 243.

As shown FIG. 2, there are at least two frequency/phase estimation and correction phases that are executed sequentially from left to right. The coarse frequency error correction is performed once using the initial coarse estimate even if there may be an ambiguity in the estimate of magnitude $+/-1/N_{dist}$. The coarse frequency estimate ambiguity is determined by the coarse frequency ambiguity module 242 after an initial coarse frequency correction. By one embodiment, the estimated frequency error due to the coarse estimate ambiguity is combined with the fine frequency error estimate (computed by data-aided fast Fourier transform 245) before performing the 2$^{nd}$ frequency error correction. The two frequency error corrections (the coarse and the combined fine and ambiguity frequency estimates) share a common direct digital synthesizer (DDS) 249 for frequency correction.

The coarse frequency ambiguity estimator 242 commences, starting from the first pilot block, a modulation removal process based on the known pilot chips, and generates one I/Q sample (the mean of the modulation removed chips) for each pilot block. Further, the data aided phase tracker 247 is required for low chip rates and/or when there is large Doppler drift. Details regarding the ambiguity estimator 242 and the phase tracker 247 are described below with reference to FIGS. 6 and 9, respectively.

The frequency and phase corrected 1 sample per chip burst signal is split to pilots pilot chip strip and payload chip strip, 251 and 257, respectively. By one embodiment, the payload chips may be de-spread to BPSK symbols and the ACQ information bits are recovered by the FEC decoder from the de-spread symbols. The de-spread result may also be used to estimate the payload SNR through the calculated M1 and M2 values. Further, the demodulated pilot-chips may be used for signal and channel estimations (signal power Ps, noise power Pn, and channel signal-to-noise ration Ps/Pn).

In what follows is described a technique of burst detection using distributed pilots-blocks. By one embodiment, bursts are detected based on the concept of differential correlation. In order to enable a complete understanding of the specific details related to differential correlation, a discrete-time baseband complex equivalent channel model is first described.

In the discrete-time model, the receiver's matched filter output ($r_k$) can be expressed as:

$$r_k = A c_{\left\lfloor \frac{k-k_0}{N_{ss}} \right\rfloor} e^{j\left(2\pi\nu k \frac{T}{N_{ss}} + \theta_k\right)} + w_k, k = 0, 1, 2, 3, \ldots, \quad (5)$$

where the parameter A is the amplitude of the received signal, T is the symbol period, $N_{ss}$ is the sample rate in number of samples per symbol at MF output, $c_k$ is the transmitted symbol at time instant $k*T/N_{ss}$, $|c_k|=1$ and $c_k=+/-1$ for pilot symbols, $k_0$ is the time instant at which the received sample is of the first pilot symbol, $\nu$ is the frequency error, and $\theta_k$ is a random time-varying phase error at time k. For cases where phase noise is negligible, $\theta_k$ can be considered a static phase error, and $w_k$ is the white Gaussian noise sample at time k. Moreover, the operator $\lfloor * \rfloor$ in equation (5) is a floor function. Note that for a non-spread system, the parameter $c_k$ corresponds to transmitted symbols and the parameter $N_{ss}$ corresponds to the samples per symbol, whereas for a spread spectrum system, the parameter $c_k$ is in terms of chips and the parameter $N_{ss}$ is samples per chip.

For an $N_p$ by $L_p$ distributed pilot waveform ($N_p$ is the number of pilot-blocks, and $L_p$ is the length of each pilot-block in terms of number of chips), the k-th output sample of a continuous correlation of the Matched Filter (MF) output with the l-th BPSK pilot block (referred to herein as l-th partial correlation) can be expressed as:

$$S_{l,k} = \frac{1}{L_p} \sum_{i=0}^{N_{ss}L_p - 1} r_{N_{ss}(L_p+L_1)l+i+k} \cdot \tilde{c}_{l,N_{ss}(L_p+L_1)l+i}, \quad (6)$$

$$l = 0, 1, 2, \ldots, N_p - 1, k = 0, 1, 2, 3, \ldots$$

$$\tilde{c}_{l,i} = \begin{cases} c_{\frac{i}{N_{ss}}}, & \langle i \rangle_{N_{ss}} = 0, N_{ss}(L_p + L_1)l \leq i < N_{ss}(L_p + L_1)l + N_{ss}L_p \\ 0, & \text{otherwise} \end{cases} \quad (7)$$

The $l^{th}$ partial correlation is either +1 or −1, wherein the operator $\langle * \rangle N$ performs modulo N in Eq. (7).

Note that the l-th partial correlation reaches a peak when $k=k_0$, and assuming negligible phase noise, it can be expressed by:

$$S_{l,k_0} = \frac{A}{L_p} \sum_{i=0}^{L_p-1} e^{j\left(2\pi n k_0 \frac{T}{N_{ss}} + \theta_0\right)} \cdot e^{j2\pi v(L_p+L_1)lT} \cdot e^{j2\pi v iT} \quad (8)$$

$$= \frac{A}{L_p} e^{j\left(2\pi v k_0 \frac{T}{N_{ss}} + \theta_0\right)} \cdot e^{-j\pi v(L_p-1)T} \cdot$$

$$e^{j2\pi v(L_p+L_1)lT} \frac{\sin(\pi v L_p T)}{\sin(\pi v T)},$$

$$l = 0, 1, 2, \ldots, N_p - 1$$

For small frequency error v, equation (8) can be further approximated by:

$$S_{l,k_0} = A e^{j\theta'_0} \cdot e^{j2\pi v(L_p+L_1)lT}, l=0,1,2,\ldots,N_p-1, \quad (9)$$

where $\theta'_0$ is a constant phase offset that is independent of locations of pilot blocks and is given by:

$$\theta'_0 = 2\pi v T\left(\frac{k_0}{N_{ss}} + \frac{L_p-1}{2}\right) + \theta_0 \quad (10)$$

The differential correlation of pilot blocks is defined as the sum of differentials of partial correlations and is given below as:

$$U_k = \Sigma_{l=1}^{N_p-1} S_{l,k} \cdot S^*_{l-1,k}, k=0,1,2,3, \quad (11)$$

Therefore, the differential correlation reaches the peak at $k=k_0$ and, according to equations (9) and (11), it is $$U_{k_0} = \Sigma_{l=1}^{N_p-1} S_{l,k_0} \cdot S^*_{l-1,k_0} = A^2(N_p-1) \cdot e^{j2\pi v(L_p+L_1)T} \quad (12)$$

It must be appreciated that the peak correlation value $|U_{k_0}|$ is $(N_p-1)*P_s$, where $P_s=A^2$ is the pilot signal power. The phase of the peak is proportional to the angular frequency error and the coarse frequency error estimate is given by:

$$v = \frac{1}{2\pi(L_p+L_1)T} \arg\{U_{k_0}\} \quad (13)$$

The amplitude of the maximum frequency error must be smaller than $0.5/(L_p+L_1)$ in order to avoid phase wrap around in equation (12), wherein $L_1$ is the length of the payload block. Accordingly, as stated previously, the differential correlator 220 and the global peak search 222 of FIG. 2, perform both the burst detection and the initial coarse frequency error estimation.

Figure 3:
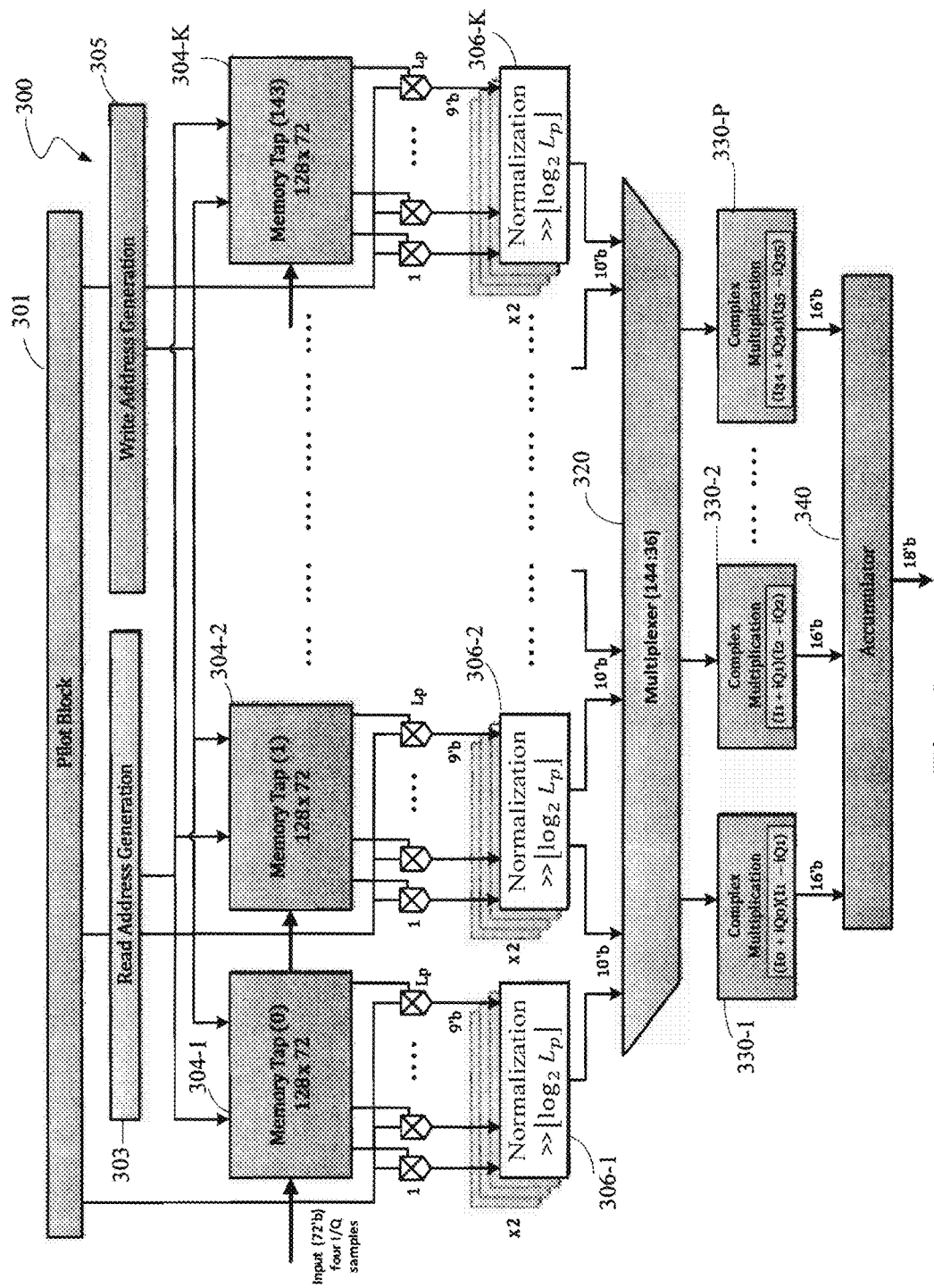
FIG. 3 illustrates an exemplary FPGA architecture of a differential correlator according to one embodiment of the present disclosure.

FIG. 3 illustrates an exemplary field programmable gate array (FPGA) architecture of a differential correlator 300 according to one embodiment of the present disclosure. Although the differential correlator in this example is illustrated as an FPGA, the correlator may alternatively be implemented with other circuitry, or as a programmed processor. The differential correlator 300 supports processing of burst signals with the following parameters: maximum number of pilot blocks used for detection of 144 pilot-blocks, maximum length of each pilot-block of 28 chips, maximum distance between two pilot blocks of 240 chips (i.e., 480 samples), and an input data rate of 30 mega chips per second.

Additionally, a TDMA system may require a different pilot sequence and different distributed pilot parameters such as $N_p$, $L_p$ and $N_{dist}$, for different modulation-coding schemes (referred to herein as MODCOD, i.e., modulation, coding, and spreading factor). Accordingly, a single differential correlator as described herein with reference to FIG. 3 and FIG. 4 incurs the advantageous ability of being programmable in real time to detect traffic bursts of all supported MODCOD's including spread spectrum acquisition signals. Furthermore, although for some supported MODCODs' the number of pilot blocks is larger than 144, which is the maximum number of pilot blocks used for detection, it is observed that a 144-block differential correlator is sufficient enough for detection of these MOD-CODs' at their intended SNR operating regions.

The differential correlator 300 includes a plurality of partial differential correlators. For a burst signal including $N_p$ pilot-blocks, the differential correlator 300 includes $N_p$ partial differential correlators. For a burst signal including $N_p$ pilot-blocks, wherein each pilot-block has a length denoted by $L_p$, the pilot block 301 in FIG. 3 only needs to store bits of dimension $N_p$ by $L_p$.

The differential correlator 300 includes programmable memory taps labelled 304-1 to 304-K, wherein K is equal to the number of pilot-blocks ($N_p$) in the burst signal. For instance, as shown in FIG. 3, there are K=144 memory taps corresponding to a burst signal including 144 pilot-blocks. Each partial correlator has a corresponding memory tap 304. By one embodiment, the memory tap may be realized by a plurality of tapped delay elements. Accordingly, as is described next with reference to FIG. 4, the memory tap is programmable to have a delay that corresponds to the length of the pilot block of the burst signal under consideration. Further, in order to support a composite data rate of 30 Mchips per second (i.e., 60 mega samples/sec), the incoming baseband data is multiplexed in such a manner that each sample is actively processed every clock cycle of a clock signal having frequency 240 MHz. The differential correlator 300 includes a read address block 303 and a write address block 305, which respectively enable the reading/writing of addresses into the memory taps.

According to one embodiment, each of the incoming samples are complex in nature, having an in-phase component (I) and a quadrature phase component (Q). Each of the I and Q portions of each sample, have a predetermined length (e.g., nine bits in length) and the samples are spaced at a predetermined number of clock cycles (e.g., four clock cycles) apart from one another. In order to process the incoming I and Q samples, a predetermined number of samples are concatenated (e.g., four consecutive samples) to form a word (e.g., a 72 bit word corresponding to four I/Q samples) that is written to a first memory block 304-1 every predetermined number of clock cycles. For instance, referring to FIG. 3, a 72-bit word is written to the memory tap (0) each 16 clock cycles. Accordingly, the depth of each memory tap 304-1 to 304K is 128 (or alternatively 256 chips) in order to support a worst case pilot-block distance ($N_{dist}$) of 240 chips.

By one embodiment, the predetermined numbers of samples are processed simultaneously to output a normalized value, after multiplying each sample with a corresponding pilot-symbol included in a pilot-block associated with the corresponding memory tap. Additionally, by one embodiment, the pilot-blocks are assigned a value of +1 or −1. Accordingly the multiplication operation of the incoming sample with the pilot-block can be further simplified to either pass the sample as it is, or negate the sample before being input to an adder.

Further, at every clock cycle, all the necessary samples stored in previous memory locations are read and input to the adder/normalization block to collectively form the output of each partial correlator module. For instance, as shown in FIG. 3, the incoming nine-bit samples are transmitted to a memory tap 304-1, wherein each sample is multiplied by the corresponding pilot-block (of length $L_p$) to output a nine-bit result. It must be appreciated that the inputs to each of the normalization blocks 306-1 to 306-K are two streams (x2) of I and Q samples that are multiplied to the corresponding pilot-block. Further, by one embodiment, the number of normalization blocks is equal to the number of memory taps, i.e., each memory tap has a corresponding normalization block 306 associated with it.

By one embodiment, each normalization block 306-1 to 306-K averages the sum of partial correlations of the samples with the corresponding pilot-blocks. The division operation is substituted by a shift operation, rounded down to the nearest power of two. Specifically, each normalization block performs the averaging operation by performing a right shift operation that has a magnitude equal to a logarithmic value of the length of the pilot-block. Thus, as shown in the non-limiting example of FIG. 3, each of the normalization blocks takes as input a plurality of nine-bit streams (corresponding to the partial correlation results of each sample) and computes a 10 bit average.

In order to reduce the number of resources required in the subsequent stages to conserve area, the data output from the partial correlator stage (i.e., output of the normalization blocks 306-1 to 306-K) is multiplexed (via a multiplexer 320) into each of a predetermined number of complex multipliers. It must be appreciated that the number of complex multipliers 330-1 to 330-P is lower than the number of normalization blocks 306-1 to 306-K (i.e., K>P). By one embodiment, the value of K is 144 and the value of P is 36. Each of the complex multipliers 330-1 to 330-P computes a complex conjugate multiplication of neighboring samples in a time shared manner.

For example, as shown in FIG. 3, the complex multiplier 330-1 performs the complex multiplication of the sample $I_0+iQ_0$, with the conjugate of the neighboring sample $I_1-iQ_1$. It must be appreciated that each of the multiplier blocks 330-1 to 330-P, processes a predetermined number of I and Q samples (e.g., four samples) before a new pair of I/Q samples are input to the correlator a predetermined number of clock cycles later e.g., sixteen clock cycles, in a time-shared manner.

The outputs of the complex multipliers 330-1 to 330-P are input to an accumulator 340. The accumulator 340 may be a 5-stage parallel adder having appropriate rounding, truncation and saturation being performed at every stage (based on the programmed number of blocks in the correlator) to output, for instance, an 18-bit result that corresponds to a starting location of the first burst of the received signal. Accordingly, by determining a peak energy of the received signal (corresponding to the output of the accumulator 340), the differential correlator 300 provisions for demodulation of the burst signal.

Figure 4A:
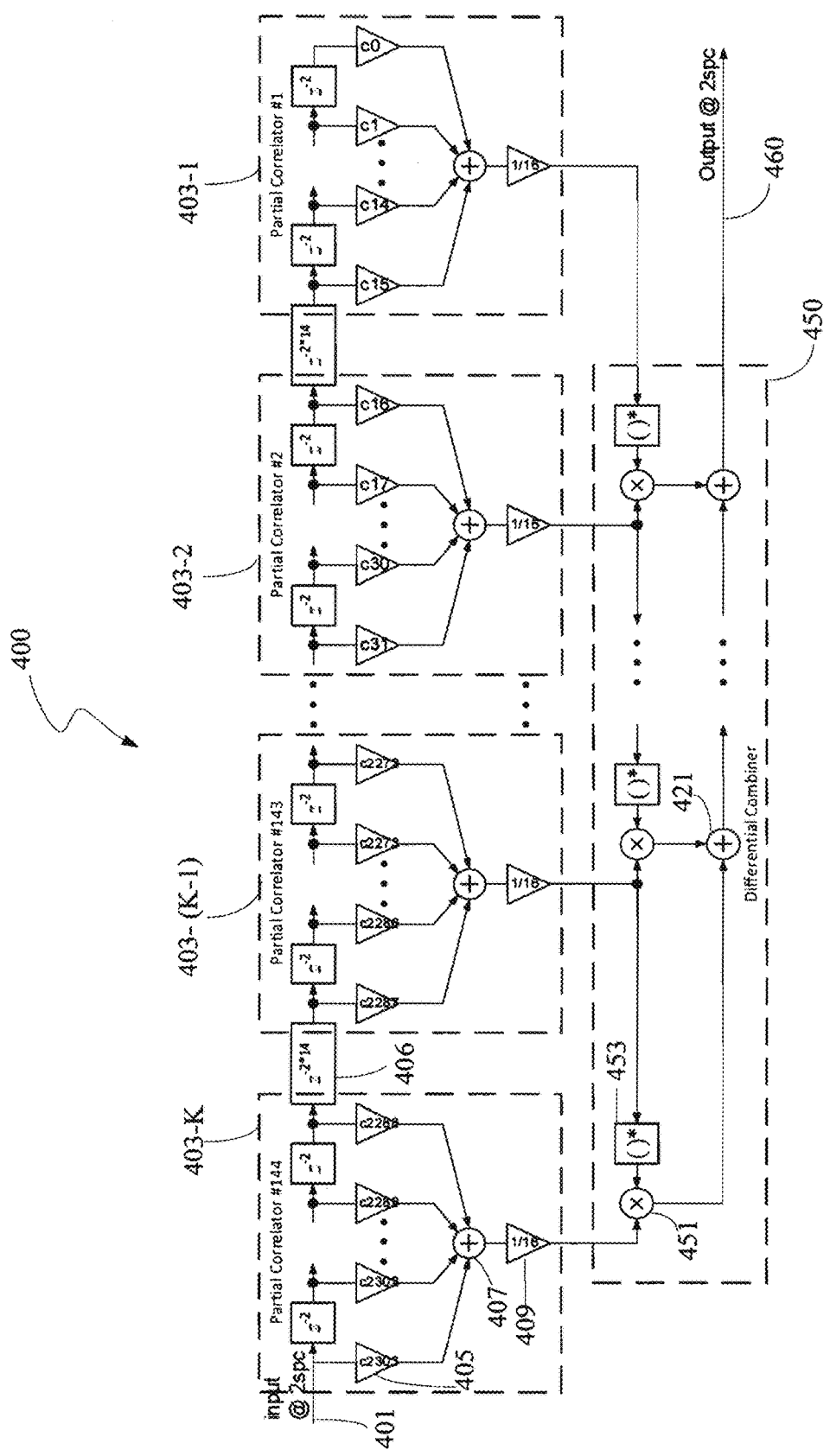
FIG. 4A depicts an exemplary differential correlator structure for a spread spectrum acquisition burst signal.

FIG. 4A depicts an exemplary differential correlator structure 400 for a spread spectrum acquisition burst signal. For sake of simplicity, it is assumed that the number of pilot blocks in the incoming burst signal are $N_p$=144 pilot-blocks. Accordingly, the differential correlator 400 includes 144 partial correlators 403-1 to 403-K (i.e., K=144). Furthermore the length of each pilot-block is assumed to be 16 chips (i.e., $L_p$=16). Accordingly, each partial correlator 403 includes 16 multiplication modules 405. Note that the multiplication modules are configured to either pass the sample as it is, or negate the sample before being input to an adder 407.

Furthermore, each partial correlator 403 includes a plurality of tapped delay elements 402. By one embodiment, the tapped delay 402 may be implemented with an FPGA memory block to implement a shift register. It must be appreciated that the taps 402 in the partial correlator 403 can be programmed to range between 2 and 28 pilots in length based on the type of burst signal, with the distance between pilot blocks ranging between 30 and 240 chips. Furthermore, the samples are transferred from one partial correlator to the next partial correlator after incurring a delay 406. The magnitude of the delay corresponds to the length of the payload block ($L_1$) of the burst signal. Specifically, the delay 406 can be programmed to a particular value based on the inter pilot-block length of the burst signal.

The partial correlations computed (using equation (6)) by each partial correlator 403 are normalized in a normalizing module 409. As stated previously, the normalizer for each partial correlator 403 performs an averaging process by performing a right shift operation on the sum of the partial correlations. Further, the partial correlation results 410 are then phase-differentially combined by the Differential Combiner 450 according to equation (11). Specifically, the differential combiner 450 multiplies 451, each sample with a complex conjugate 453 of a neighboring sample. The sum of such complex multiplications is added in adder 421 to obtain the output of the differential correlator.

By one embodiment, the differential correlator 400 performs ($N_p$-1) complex multiplications and $N_p*L_p$ complex additions for each incoming sample. The tapped delay has the length of $N_p*N_{dist}$ symbols. Note that $N_p$ is the number of pilot blocks used for burst detection, which can be equal to or smaller than the total number of pilot blocks of the distributed pilot waveform. For instance, in the case of spread spectrum acquisition, only the first 144 (out of 147) pilot blocks are used for burst detection due to FPGA resource limitation. Furthermore, by one embodiment, each partial correlator performs for each sample of the burst signal, a first number of complex multiplication and complex addition operations. Specifically, the first number of complex multiplications as well as complex addition operations performed by each correlator (for each sample) have a magnitude that is one lower than the number of pilot blocks included in the burst signal i.e., $N_p$-1.

Figure 4B:
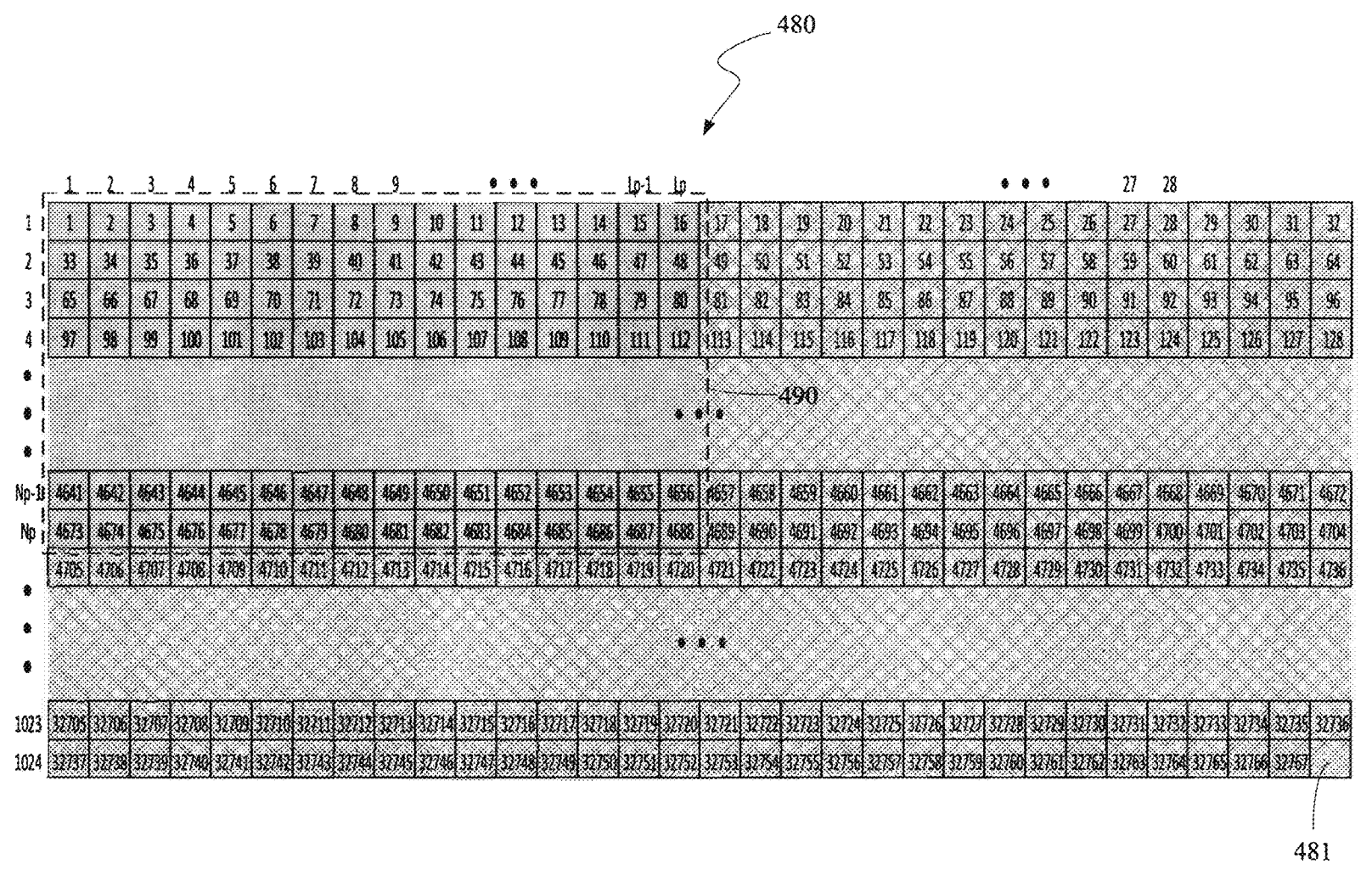

According to one embodiment, in order to minimize the complexity and to simplify the design of the programmable differential correlator as shown in FIG. 3, which may be a computationally intensive processing block in the TDMA demodulator, the pilot sequences for different MODCODs are generated from a common PN (pseudorandom numbers) sequence, referred to as the master PN sequence. FIG. 4B depicts an exemplary master PN sequence 480 that is 32768 bits in length. By an embodiment, the selected master PN sequence may be a 'm-sequence' of length $2^{15}-1$=32767 bits. In such a case, the master PN sequence may be re-arranged into a 1024×32 matrix 480, with an empty element 481 at the last row and column, as 32767 is 1 short of 1024×32. The numbers in the matrix correspond to the master PN indices. For a given set of parameters $L_p$ and $N_p$, the $N_p$ pilot blocks, each of which have a length of $L_p$ bits can be arranged in a sub-matrix 490 that is defined by the first $N_p$ rows and the first $L_p$ columns.

In what follows is described a technique of determining ambiguity in a frequency error estimate performed by the burst signal demodulator. Specifically, the coarse frequency ambiguator in FIG. 2 determines a bias in a frequency estimate of a received signal. Let $N_{dist}$ be the distance in number of chips between two adjacent pilot blocks. When the TDMA burst experiences a frequency offset $\Delta f$, the phase rotation from pilot block k to block k+1 can be expressed as:

$$\theta_{k+1} - \theta_k = 2*\pi*\Delta f*N_{dist} \quad (14)$$

Note that the coarse frequency estimation is based on the estimate of the average phase rotation between adjacent pilot blocks. Accordingly, by one embodiment, the maximum phase rotation is to be limited between $\pm\pi$, in order to avoid ambiguity of frequency error polarity. For instance, if the estimated mean phase rotation in $N_{dist}$ symbol interval is $\pi-\Delta$, where $\Delta$ is a small positive value, and we assume that it is the true phase rotation amount, it follows that the frequency error estimate will be $(\pi-\Delta)/(2\pi*Ndist)\approx 0.5/N_{dist}$. However, if the phase rotation is not limited within $\pm\pi$, then a true phase rotation of $-\pi-\Delta(<-\pi)$ will also lead to a phase estimate of $\pi-\Delta$, as the estimated phase always has a value in the range of $\pm\pi$. As a result, the frequency error estimate is also $0.5/N_{dist}$, instead of the true frequency error $(-\pi-\Delta)/(2\pi*Ndist) \approx -0.5/Ndist$.

Figure 5:
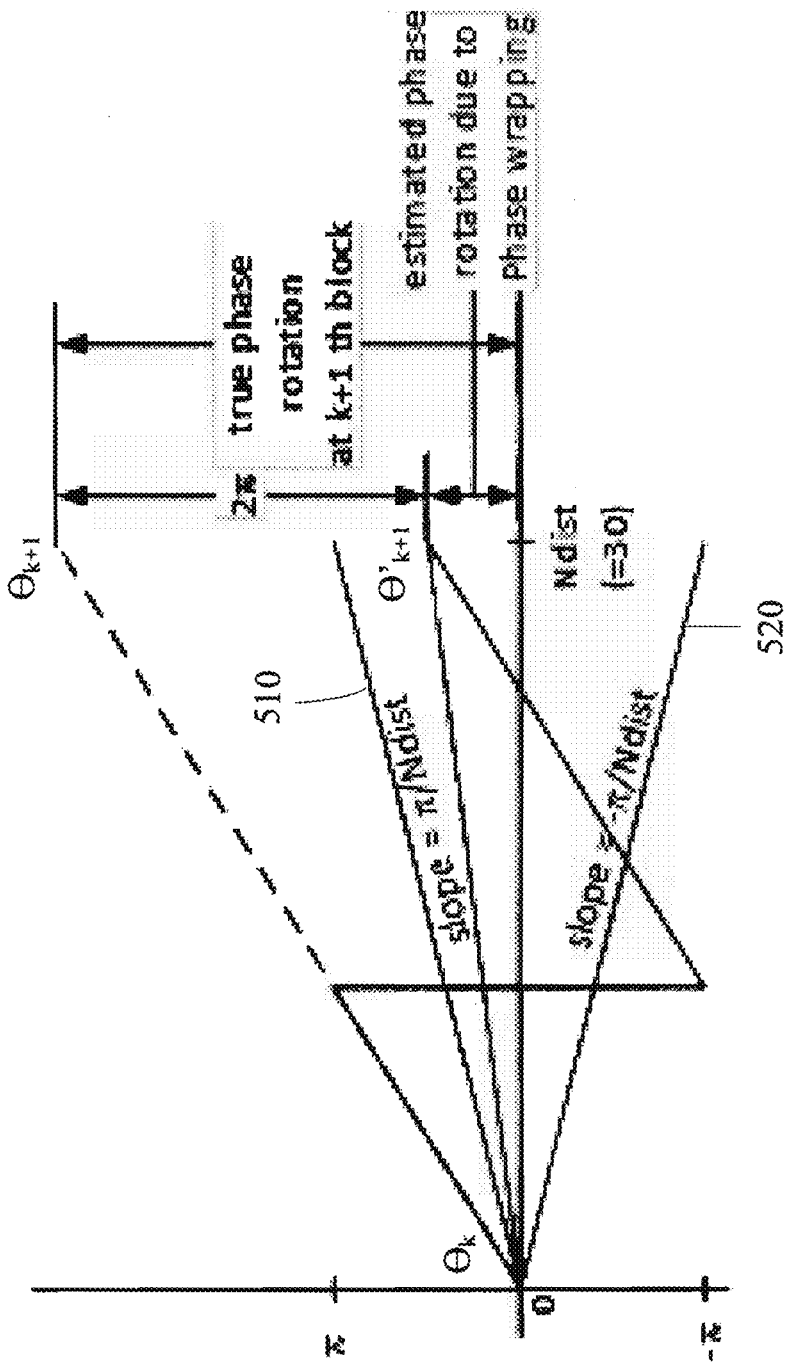
FIG. 5 depicts an exemplary graph illustrating a pilot-block's phase rotation due to frequency error.

FIG. 5 depicts an exemplary graph illustrating a pilot-block's phase rotation due to frequency error. Specifically, FIG. 5 illustrates the phase ambiguity if phase rotation is not within $\pm\pi$ or equivalently, if frequency error is outside the range of $\pm 0.5/N_{dist}$. Referring to FIG. 5, the area in between the lines 510 and 520 defines the ambiguity-free region, assuming phase rotation begins at the k-th pilot block (or the phase rotation is 0).

Note however, that if the frequency error is greater than the $0.5/N_{dist}$, i.e., as shown by the dashed line in FIG. 5, the slope of the phase rotation (drift) due to frequency error $\Delta f$ is larger than $\pi/Ndist$, the true phase rotation $\theta_{k+1}$ at the k+1 th pilot block, which is outside the primary phase region of $\pm\pi$ will be wrapped to $\theta'_{k+1}(=\theta_{k+1}-2\pi)$. Accordingly, the coarse frequency estimate will be $\Delta f'=(\theta_{k+1}-2\pi)/2\pi*N_{dist})=\theta_{k+1}/2\pi*N_{dist})-1/N_{dist}=\Delta f-1/N_{dist}$. In other words, the coarse frequency estimate is incorrect by a bias of $1/N_{dist}$.

In a similar manner, the coarse frequency estimate can be biased by a factor of $-1/N_{dist}$ if the frequency error is lower than $-0.5/N_{dist}$ (but higher than $-1/N_{dist}$). Therefore, the coarse frequency estimation ambiguity will be $\pm 1/N_{dist}$ for $0.5/Ndist<|\Delta f|<1/N_{dist}$. Accordingly, as is described next, the coarse frequency ambiguator 242 of FIG. 2 estimates the discrete frequencies $\{-1/N_{dist}, 0, +1/N_{dist}\}$ so that the estimation ambiguity of the coarse frequency error can be resolved and, as a result, the present disclosure incurs the advantageous ability of doubling the frequency error tolerance from $\pm 0.5/N_{dist}$ to $+1/N_{dist}$.

Figure 6:
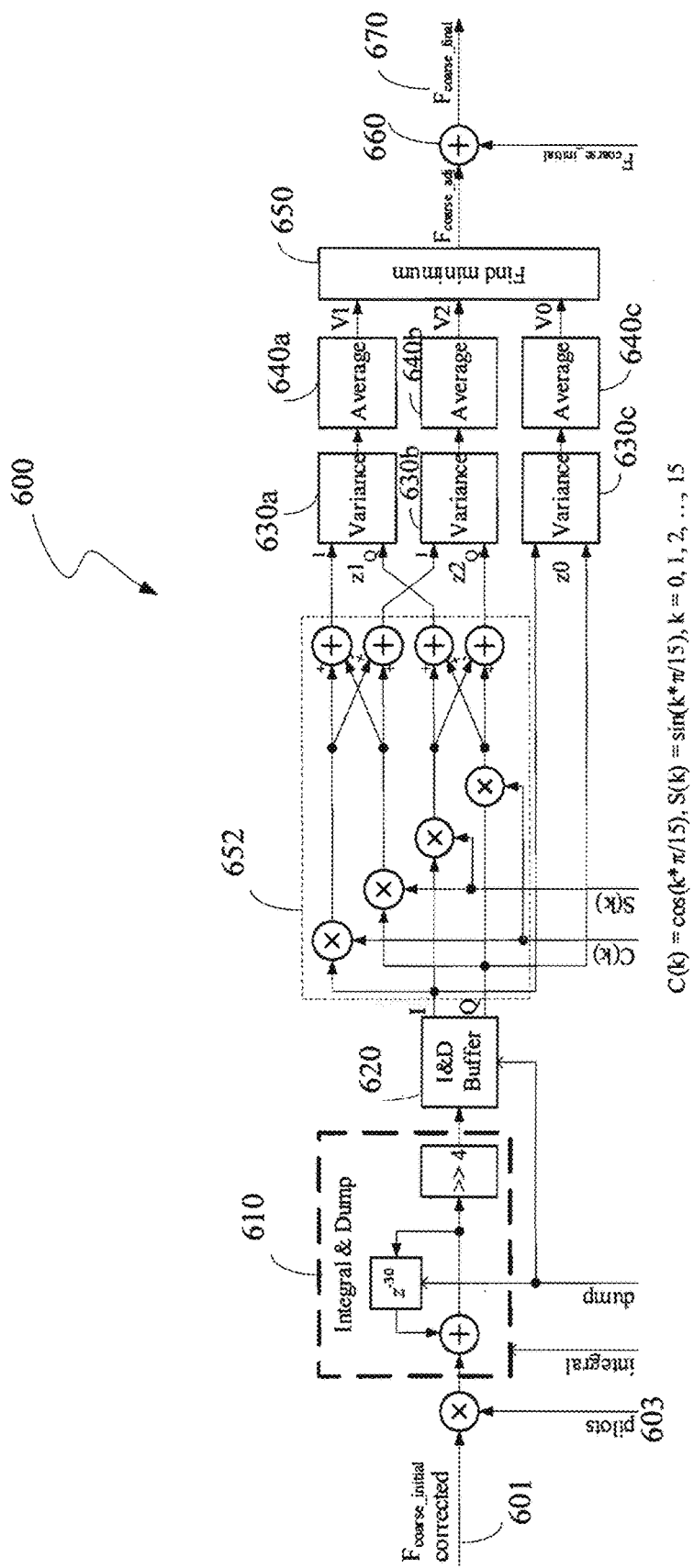
FIG. 6 depicts according to an embodiment, an exemplary ambiguity estimator.

FIG. 6 depicts an exemplary ambiguity estimator 600. According to an embodiment, the ambiguity of coarse frequency estimation can be determined by the ambiguity estimator 600. The input to the estimator is a coarse frequency error corrected signal that is sampled at a rate of 1 sample per chip. The signal is read from the Burst Buffer 241 in FIG. 2.

The signal is first modulation removed by multiplying the known pilot chips 603 at each pilot block so that the phases of modulation removed I/Q samples at these pilot locations may drift with time (or chip index), based on a residual frequency error. Specifically, a pilot phase is a signal phase after modulation is removed from a pilot-chip position. To remove the modulation of a received chip corresponds to multiplying the received chip with the transmitted chip that may have a value of +1 or −1. Accordingly, a pilot-block phase is defined herein as an average phase of the modulation removed pilot block. The modulation removed signal is labeled as x(n) and depicted in FIG. 7. The ambiguity estimator 600 includes an Integral & Dump block 610 that integrates a predetermined number of modulation removed samples. For instance, by one embodiment, the integral and dump filter integrates every 16 x(n) samples that are 30 chips apart and dumps the average of the 16 samples to a new signal y(n) (represented as signal 730 in FIG. 7). The signal y(n) is stored in an integral and dump buffer 620.

Further, the signal y(n) is output from the integral and dump buffer and passed to a pair of variance and averaging processing modules. For instance, the signal y(n) is input as signal z0 to the variance and averaging processing modules 630c and 640c respectively. The signal y(n) is further processed to generate new signals, depicted in FIG. 6 as signals z1 and z2, respectively. Specifically, the signal z0 is frequency shifted by amounts+$1/N_{dist}$ and −$1/N_{dist}$, respectively by the upper four signal paths 652 of the buffer 620 to generate signals z1 and z2. Each of the signals z1 and z2 are also input to respective variance and average processing modules 630a, 630b, 640a and 640b respectively. The variance processing blocks 630a-630c in FIG. 6 calculate the signal variance for the z0, z1 and z2 A z2, and z0 signals, respectively. The Average processing blocks 640a-640c compute the average values for z1, z2, and z0 signals, respectively. By one embodiment, the final ambiguity estimate corresponds to the frequency shift that gives the minimum of the 3 values V0, V1 and V2 as expressed below for a value of $N_{dist}=30$:

$$F_{coarse\_adj} = \begin{cases} -\frac{1}{30}, & \text{if } V2 = \min(V0, V1, V2) \\ 0, & \text{if } V0 = \min(V0, V1, V2) \\ +\frac{1}{30}, & \text{if } V1 = \min(V0, V1, V2) \end{cases} \quad (15)$$

Upon computing the bias (i.e., one of 0, +$1/N_{dist}$, −1/Ndist), the frequency of the signal may be corrected as shown below:

$$F_{coarse\_final} = \begin{cases} F_{coarse\_initial} - \frac{1}{N_{dist}}, \text{ or} \\ F_{coarse\_initial}, \text{ or} \\ F_{coarse\_initial} + \frac{1}{N_{dist}} \end{cases} \quad (16)$$

Figure 7:
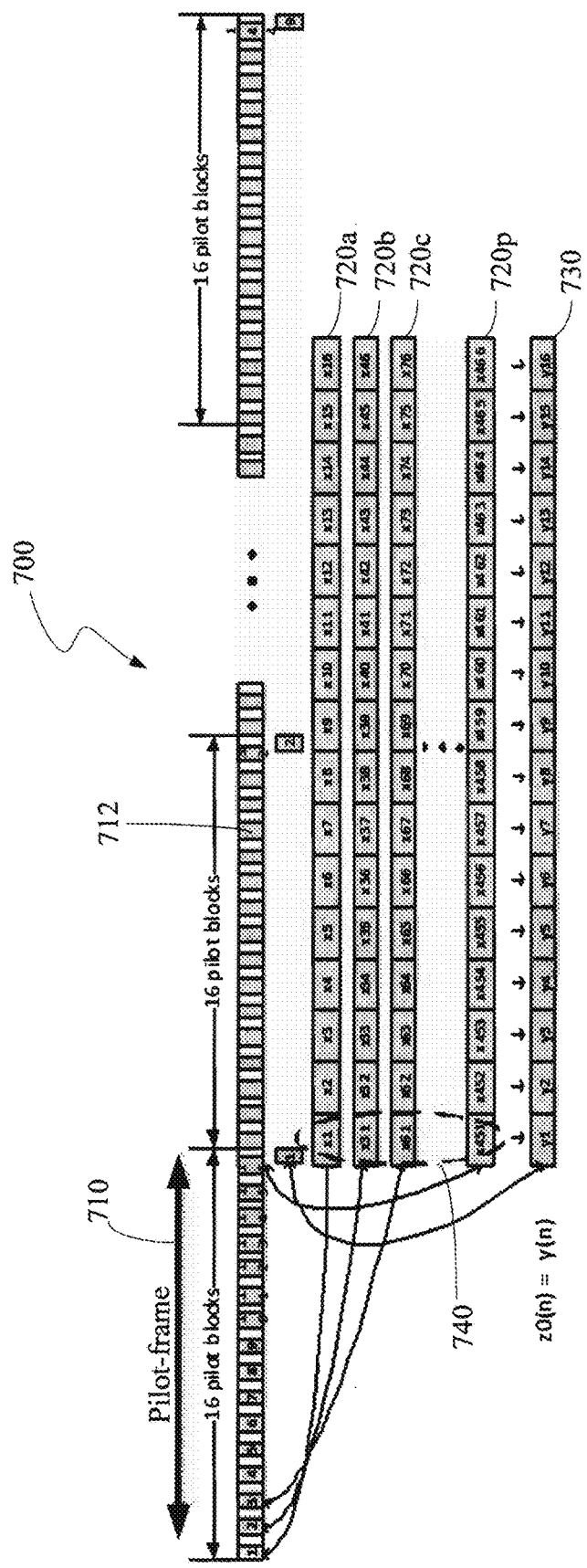
FIG. 7 illustrates an exemplary modulation removed signal.

In what follows, is described with reference to FIG. 7, an example illustrating the working of the frequency ambiguity estimator 600. FIG. 7 illustrates an exemplary modulation removed signal x(n) 700. The signal 700 depicted in FIG. 7 includes a plurality of pilot-frames 710, wherein each pilot-frame includes a predetermined number of pilot-blocks 715. For instance, as shown in FIG. 7, a pilot frame 710 includes a total of 16 pilot-blocks. Thus, there are nine pilot-frames for a total of 144 pilot-blocks.

Each pilot-block 715 includes a predetermined number of pilot-chips. As shown in FIG. 7, each pilot block includes 16 pilot-chips. Specifically, the first 16 pilot-blocks 715 (included in the first pilot-frame 710), each comprise 16 pilot-chips. The pilot-chips corresponding to the first 16 pilot-blocks are labelled as 720a-720p, respectively.

The integral and dump filter 610 (FIG. 6) integrates every 16 x(n) samples that are $N_{dist}$ chips apart (e.g. $N_{dist}$=30) and dumps the average of the 16 samples to a new signal y(n) 730. Specifically, as shown in FIG. 7, there will be 16 y samples for every 16 pilot blocks (included in one pilot-frame) and a total of nine 16-sample y blocks will be generated and stored in the I&D Buffer. For example, in FIG. 7, the signal 730 corresponds to the first y(n) signal associated with the first pilot-frame. Note that each of the 16 samples of 730 are computed as averages of the corresponding pilot-chips associated with the pilot-frame. For example, the first sample of y(n) represented as y1 is an average of the sixteen pilot-chips 740 that are labelled x1, x31, x61, . . . x451, with each consecutive pilot-chip being $N_{dist}$ (=30) chips apart. Accordingly, a total of nine 16-sample y blocks will be generated and stored in the I&D buffer.

As stated previously, each of the 9 blocks of y (or z0) signal is frequency shifted by −1/30 and +1/30 to generate new signal z1 and z2. The variance blocks (shown in FIG. 6) calculate the signal variance for each of the 9 blocks of z0, z1 and z2. Therefore, there will be a total of 9 variance values computed for each of the z signals. Additionally, the average processing blocks calculate the average of the 9 computed variance values for z0, z1 and z2 in order to determine the ambiguity in frequency estimation.

By one embodiment, the accuracy of coarse frequency estimation directly affects the result of subsequent digital signal processing modules of the demodulator as shown in FIG. 2. Contrary to the traditional acquisition slots, the spread spectrum acquisition slot of the present disclosure needs to have a frequency tolerance, as the phases of adjacent pilot blocks may have over ±π rotation. Such a phenomenon is referred to herein as phase ambiguity, which needs to be estimated and removed.

Figure 8:
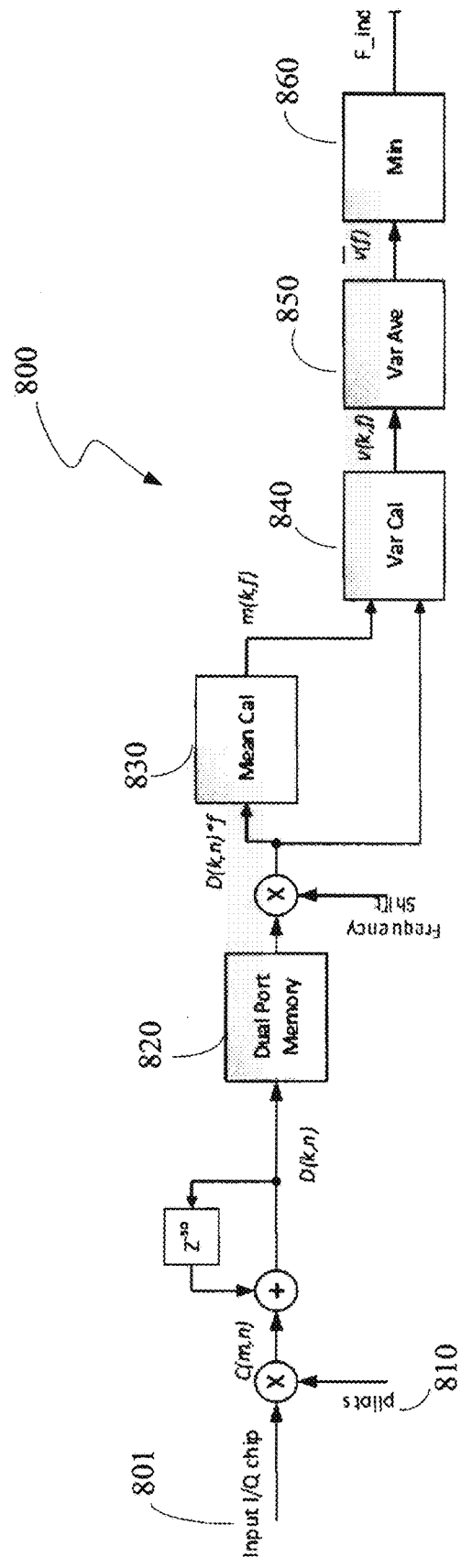
FIG. 8 depicts according to an embodiment, an exemplary block diagram of a phase ambiguity estimator.

FIG. 8 depicts according to an embodiment, an exemplary block diagram illustrating a phase ambiguity estimator 800. The input to the phase ambiguity estimator is I/Q signal sampled at 1 sample per chip 801. The input stream of samples is modulation removed by correlating pilot chips and the known pilot sequence 810. In the following, for the sake of convenience, the number of pilot-blocks $N_p$ is assumed to be 144, and the number of pilot-chips included in a pilot-block are 16. It must be appreciated that such specific values are intended to be illustrative and are in no manner limiting the scope of the present disclosure. In other words, the technique of phase ambiguity estimation described herein is equally applicable to other values of number of pilot-blocks and number of pilot-chips included in the pilot-block.

The n-th modulation removed chip of pilot block m is expressed as C(m, n), where 0≤m≤143, 0≤n≤16. For each 16 pilot-blocks, the signal with same chip number is accumulated as follows:

$$D(k,n) = \sum_{i=0}^{15} C(16*k+i, n) \quad (17)$$

where 0≤k≤8, 0≤n≤16. As shown in FIG. 8, D(k, n) is stored in a dual port memory 820 and read back to calculate its variance under different frequency shifts, v(k, j), where 0≤k≤8, f∈{−1/$N_{dist}$, 0, 1/$N_{dist}$} for $N_{dist}$=30.

Since there are enough clock cycles between two 16-pilot blocks, the variance and the mean can be computed by processing modules 840 and 830 respectively, as shown by the equations below:

$$m(k, f) = \frac{1}{16}\sum_{n=0}^{15} f * D(k, n) \quad (18)$$

$$v(k, f) = \frac{1}{16}\sum_{n=0}^{15} (f * D(k, n) - m(k, f))^2 \quad (19)$$

Accordingly, we obtain 9 variance values for each frequency offset. Further, the mean of the 9 variance values 850 for each frequency offset can be calculated as shown below:

$$\overline{v}(f) = \frac{1}{16}\sum_{k=0}^{15} v(k, f) \quad (20)$$

Subsequently, the index corresponding to the minimal value of the mean variance 860 can be obtained to determine the amount of bias, i.e., one of {−1/$N_{dist}$, 0, 1/$N_{dist}$} in the phase estimate.

According to an embodiment of the present disclosure, is provided a technique of phase tracking. The phase tracker 247 in the demodulator depicted in FIG. 2 estimates phase variations across the pilot-blocks included in a burst signal. The phase tracker 247 performs a process of phase unwrapping. Specifically, the phase tracker removes the wrap around (across the ±Π boundary) phases of the pilot blocks.

For applications that demand a high SNR such as digital video broadband application, and which include large pilot blocks (e.g., where each pilot block includes approximately 36 pilot symbols), a simple phase un-wrapping method can be employed. However, a simple phase un-wrapping methods may fail to produce correct phase trajectories for applications which include short pilot-blocks. One reason for such a failure is the occurrence of a large phase estimation variance and cycle-slips. Such a problem tends to worsen in the case of communications on the move (COTM) applications, where mobile terminals experience a Doppler drift as vehicles (e.g., automobiles, ships, airplanes) carrying the mobile terminals accelerate or change their moving direction.

In contrast to the simple phase unwrapper which performs unwrapping by relying only on a single phase estimate (i.e. a previous phase estimate), the present disclosure describes a more robust unwrapping method that takes into consideration a number of previous phase estimates in the process of unwrapping. This robust phase unwrapping technique is based on the observations such as that: (a) with some small amount residual frequency error and not too long segment duration, a section of a contiguous phase trajectory can be obtained by shifting some constant phase amount (e.g., π/2, π, or 3π/2) the same section of the wrapped phases so that the wrapped phases becomes unwrapped in [−π, π); (b) a section of a contiguous phase trajectory always has a variance smaller than that with phase wraps; (c) for a sufficiently long segment, an outlier (due to noise or cycle slip) will less likely change the fact that a correct unwrapping result still has the variance smaller than those of the incorrect ones (i.e., with phase wraps); and (d) infrequent cycle slips after unwrapping may be corrected with a cycle slip filter.

Figure 9:
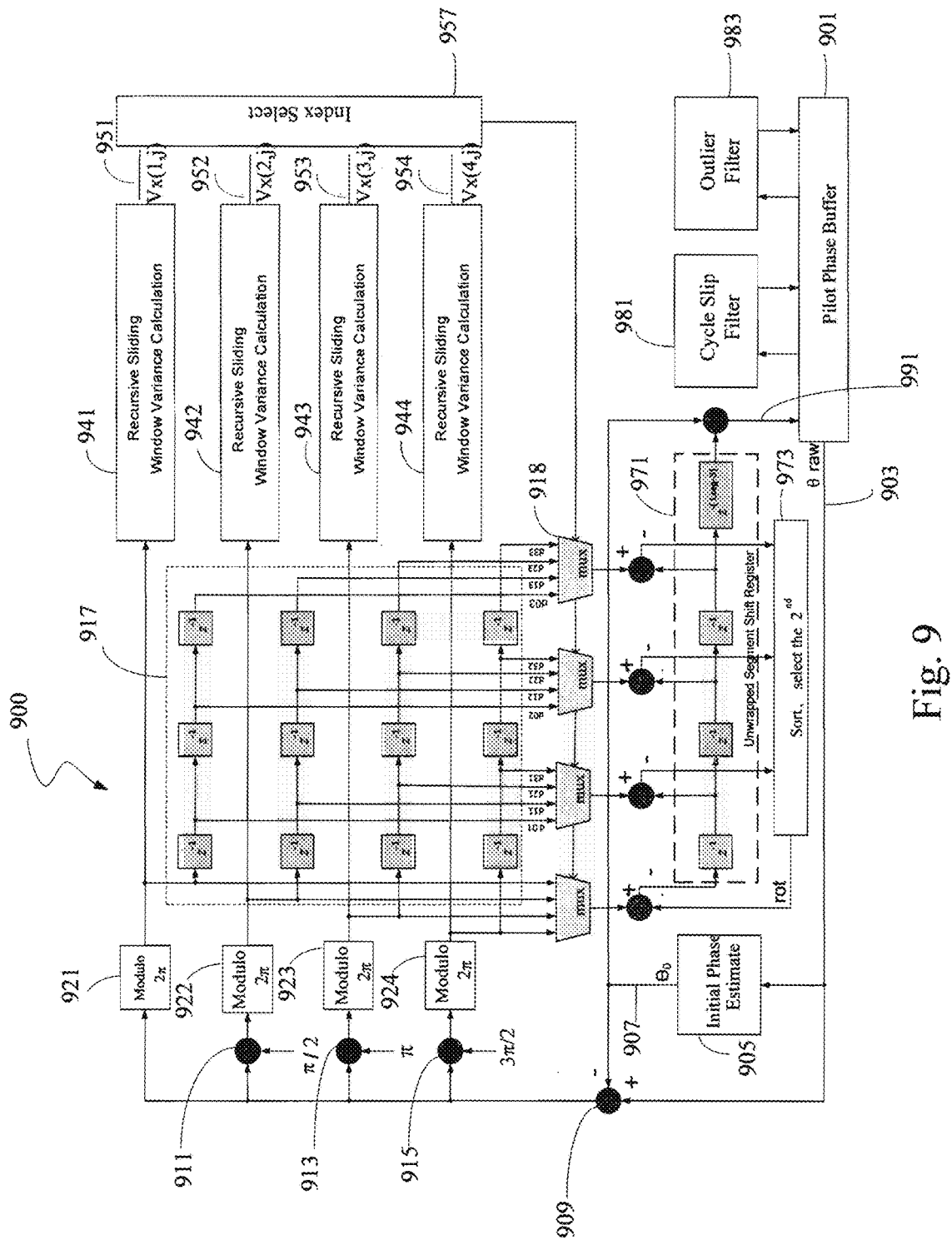
FIG. 9 depicts an exemplary phase unwrapper according to an embodiment of the present disclosure.

FIG. 9 illustrates an exemplary phase unwrapper 900. According to an embodiment of the present disclosure, the phase unwrapper 900 computes for each segment (defined herein as the number of phase values used to compute a variance) variances of four trials which are shifted from the original wrapped phase segment by phase amounts 0, π/2, π, and 3π/2, respectively.

Phase unwrapping tends to be error prone when phases are close to the phase wrapping boundaries of ±π. Accordingly, by one embodiment, the original wrapped phases are shifted in order to start from approximately 0°, so that phase wrapping occurs less frequently. As shown in FIG. 9, the phase samples are read from a pilot phase buffer 901. The pilot phase buffer 901 stores noisy phase samples of a burst signal. The noisy phase samples (depicted herein as $\theta_{raw}$) 903 are input to an initial phase estimate processing module 905. The initial phase estimate module computes an initial phase amount $\theta_0$ 907 by which the input samples are shifted in order to ensure that occurrence of phase wrap arounds is minimized. Specifically, the initial phase estimate module 905 adjusts the phases of the incoming noisy samples by shifting (via an adder 909) the phase of the noisy samples ($\theta_{raw}$) by an initial phase amount $\theta_0$. Details regarding the initial phase estimate processing module are described below with reference to FIG. 10.

Furthermore, in the embodiment of FIG. 9, phase adjusted phase sample are input to adders 911, 913, and 915 that respectively shift the phase of the sample by π/2, π, and 3π/2. Thus, a set of four phase shifted samples (0, π/2, π, and 3π/2) is obtained, each of which is respectively passed through modulo 2π blocks 921-924. The modulo 2π operator performs modulo 2 π operation to obtain a phase value which is in the range of (−π, π). For sake of convenience, a modulo 2π operation is depicted as <P, 2π>, which essentially performs the operation: P modulo 2π.

The phase shifted samples of 0, π/2, π, and 3π/2 are input respectively to recursive sliding window variance computation modules 941-944. By one embodiment, each of the recursive-sliding window variance computation modules 941-944 computes a variance of an N-sample sliding window in a recursive manner as expressed below:

$$\Delta_{1,k+1} = \theta_{k+1} - \theta_{k+N+1} \quad (21)$$

$$\Delta_{2,k+1} = \theta_{k+1}^2 - \theta_{k+N+1}^2 \quad (22)$$

$$M_{k+1} = M_k + \Delta_{1,k+1} \quad (23)$$

$$V_{k+1} = V_k - 2M_k \Delta_{1,k+1} - \Delta_{1,k+1}^2 + \Delta_{2,k+1} \quad (24)$$

wherein $\theta_k$ is a phase estimate of the k-th pilot block, and $M_k$ and $V_k$ are respectively the mean and variance of the N-sample sliding window in which $\theta_k$ is the newest phase sample.

Each of the computed variances 951-954 are input to an index selector 957. The index selector 957 is configured to select the index of a branch (951-954) whose current computed variance is the lowest among the four computed variances. Furthermore, in the possible occurrence of multiple indexes having the same smallest computed variance, the index selector 957 selects the lowest index. The variance associated with the lowest index corresponds to the unwrapped phase sample of a current iteration.

The unwrapped phase sample is transferred via multiplexers 918 to an unwrapped segment shift register 971. The unwrapped segment register includes tapped delay elements that, according to an embodiment, are used for computing differences between the last three unwrapped phase samples and three input samples that are provided by the tapped delay line 917, which is selected by the Index Selector 957. Details regarding the three differences are further described below in detail with reference to FIG. 12.

The computed differences are transferred to a sort and select module 973 that sorts the set of three difference values and determines a median value thereof. The median value corresponds to a rotation value (rot) that is to be subtracted from the phase samples. Furthermore, by one embodiment, a left shift operation is performed in the segment register 971, wherein a rightmost sample of the register is updated with the unwrapped phase value computed in a current iteration. Note that the N-sample segment updates each time a new sample is shift in from the pilot phase buffer 901. Therefore, the unwrapper calculates variances of 4 trials for each sliding window (or each new incoming sample). The unwrapped phase sample is output as 991 which is stored back into the phase buffer 901.

Figure 13A:
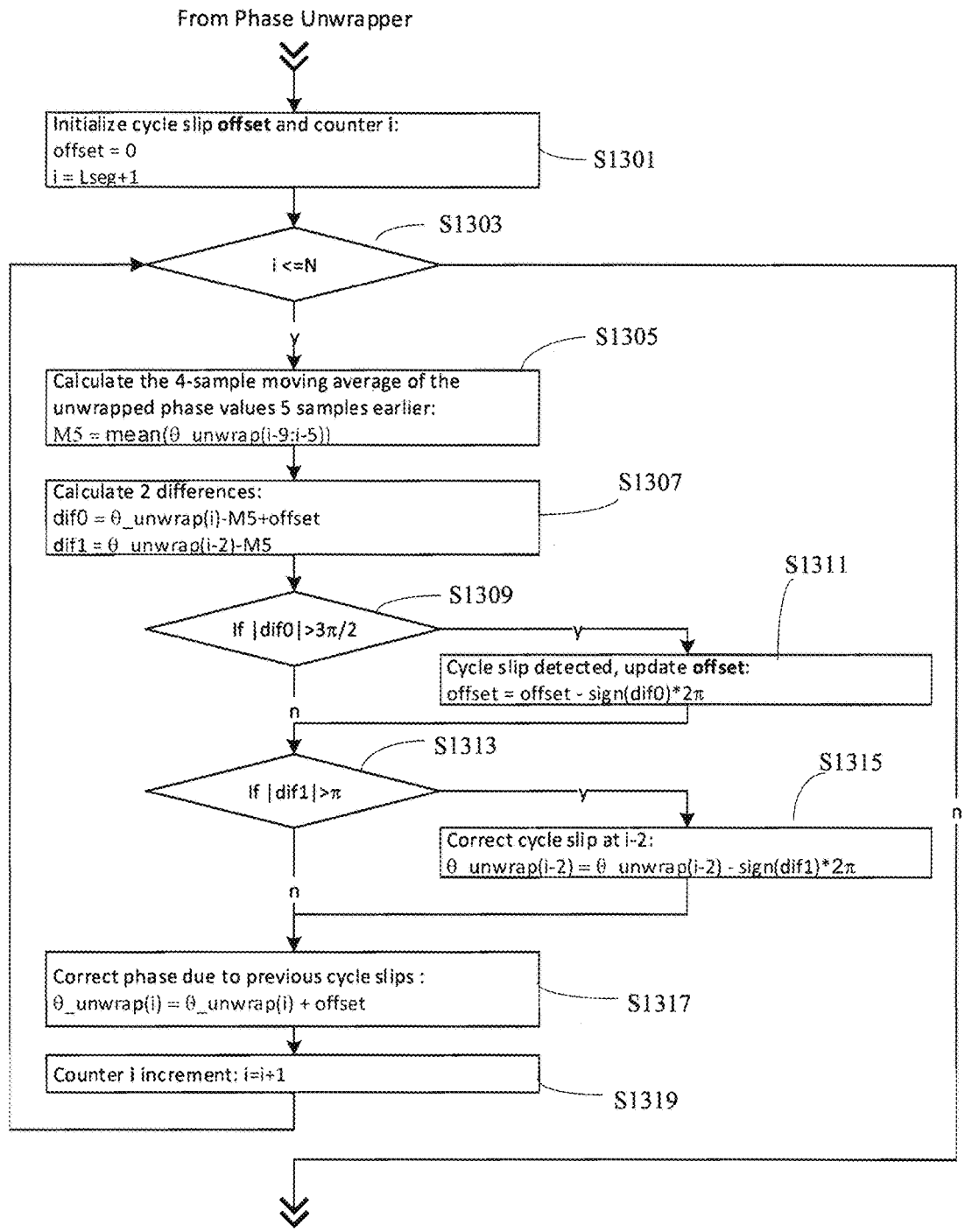
FIG. 13A depicts an exemplary flowchart illustrating the steps performed by a cycle-slip filter.
Figure 13B:
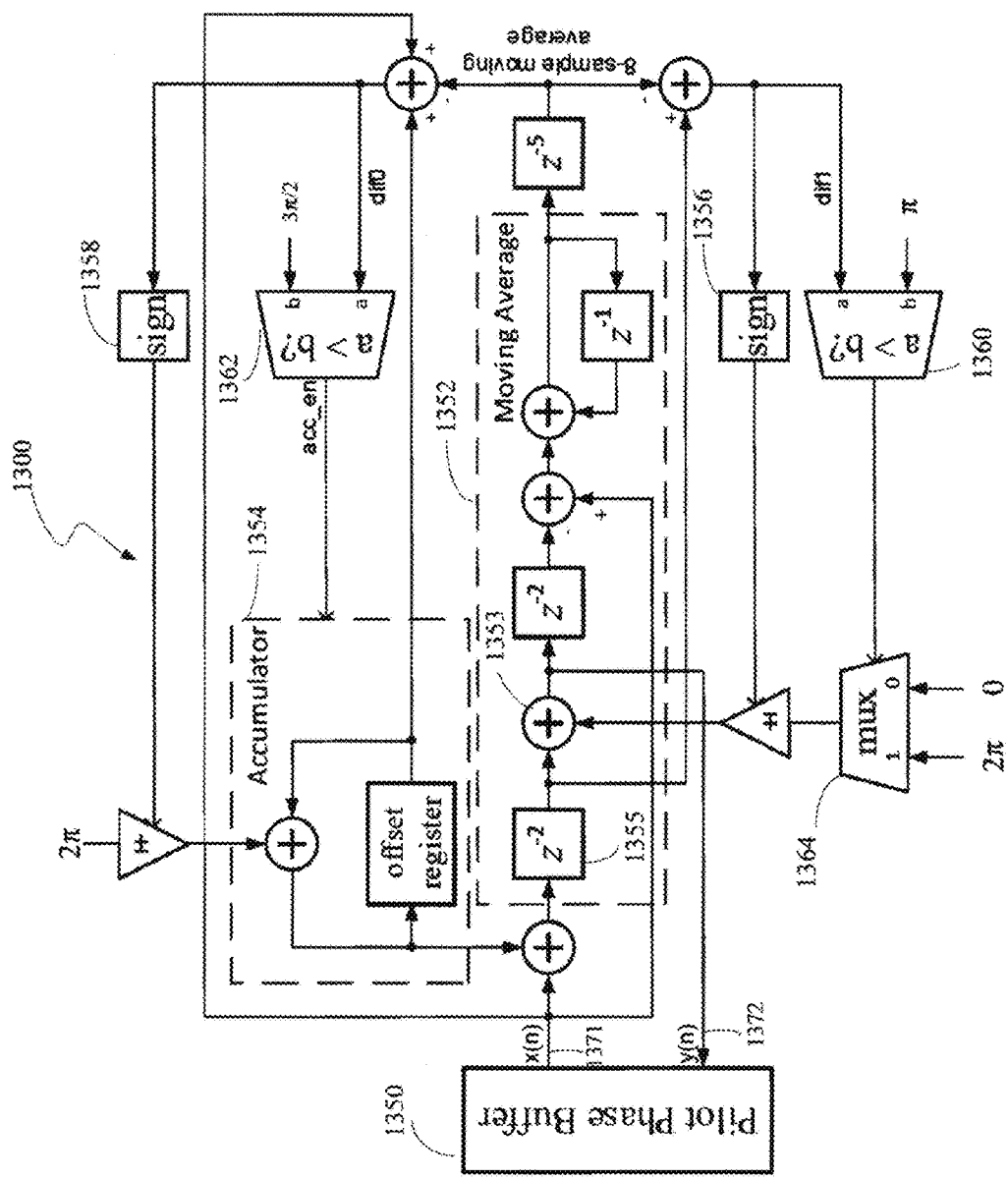
FIG. 13B illustrates an exemplary block diagram of the cycle-slip filter.

Furthermore, the above described technique of phase unwrapping may be subject to phase jumps of +/−2 π or multiples of +/−2π (referred to herein as cycle-slips) in low SNR conditions. Accordingly, described below with reference to FIGS. 13A and 13B is a cycle slip filter 981 that is used to reduce cycle slip effects. Moreover, the cycle-slip corrected phase samples may be subject to outliers, especially in low SNR conditions. Accordingly, by an embodiment of the present disclosure is provided an outlier filter 983 (described below with reference to FIGS. 14A and 14B) that is designed to remove outstanding outliers. The cycle-slip corrected and outlier corrected phase samples are eventually stored back into the pilot phase buffer 901.

As stated previously, the phase unwrapping tends to be error prone when phases are close to phase wrapping boundaries of ±Π. Thus, it is beneficial to shift the original wrapped phases by an initial phase amount ($\theta_0$) such that the phase wrap occurrences are minimized. Accordingly, by one embodiment, as shown in FIG. 10 an initial phase estimator 1000 is utilized to determine the initial phase amount ($\theta_0$) by which input samples ($\theta_{raw}$) 901 are to be shifted.

By one embodiment, the initial phase estimator 1000 computes a mean (average) phase of the first 4 unwrapped phase samples. Two trials (shifted by 0 and Π respectively) are used for 4 sample unwrapping. Furthermore, instead of calculating a variance, a simple sum of absolute values of zero-mean phases may be used to approximate the variance.

The initial phase estimator includes two portions, an upper portion 1020 and a lower portion 1030. As shown in FIG. 10, each of these portions includes an average computing module 1021, a delay module 1022, an absolute value computing module 1023, and a sample accumulator 1024.

Figure 10:
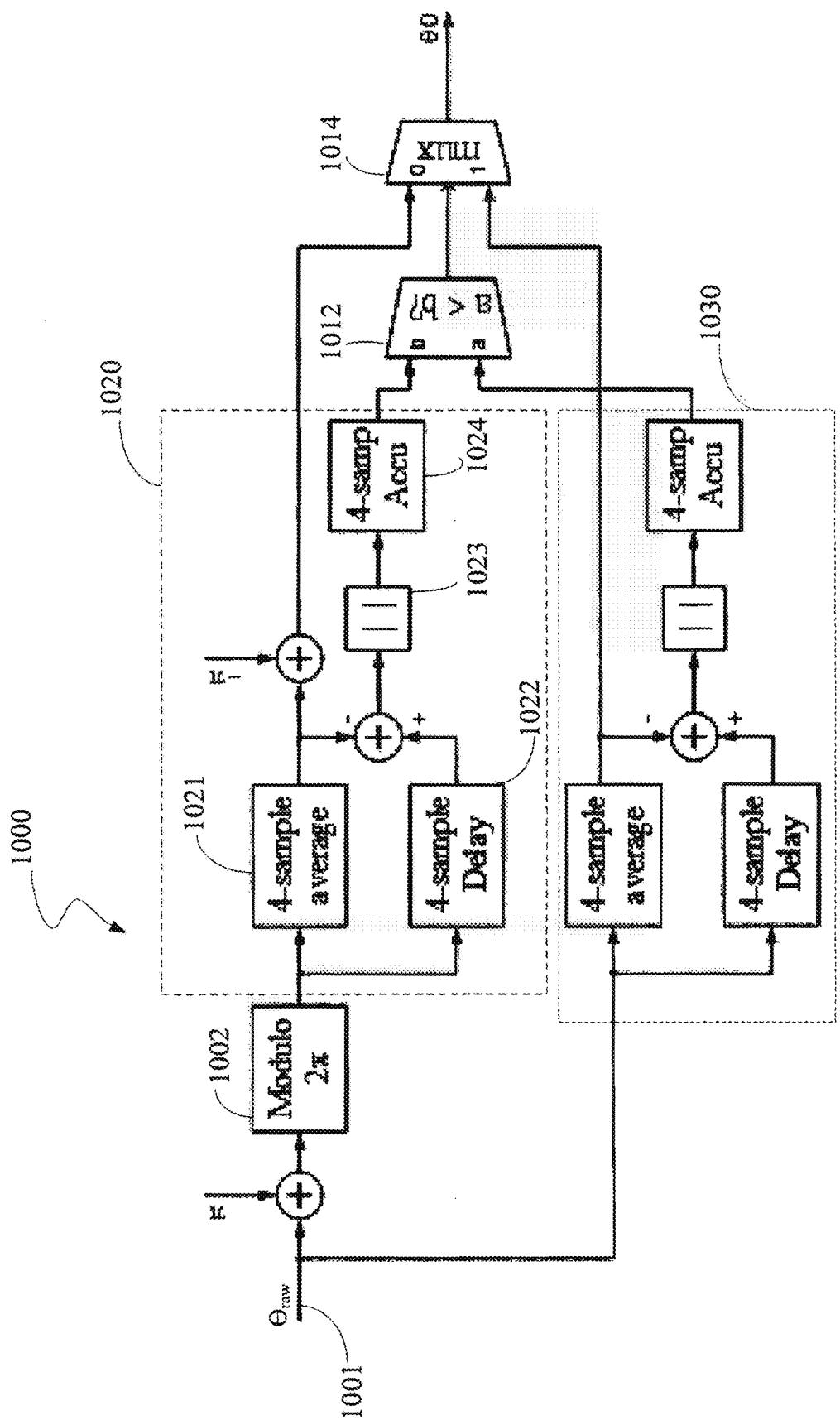
FIG. 10 depicts an exemplary initial phase estimator included in the phase unwrapper.

In FIG. 10, the upper portion 1020 calculates, for instance, an approximated variance of a first 4 values of the raw phase data having a Π offset. The Π offset sample is further passed through a modulo 2 Π block 1002 which performs a modulo operation, whereafter the sample is passed to the upper portion 1020. The lower portion 1030 calculates the approximated variance of the original data.

Additionally, the samples from the respective sample accumulators are input to a comparator 1012. If the variance from the upper portion is smaller than that of the lower portion (i.e., a<b is false), then the multiplexer 1014 outputs, as an initial phase amount ($\theta_0$), the signal on port "0", which is the unwrapped mean of the first 4 values. However, if the condition a<b is true, the multiplexer outputs (as the initial phase amount) the signal on port "1", which is the direct mean of the first 4 phase samples.

Figure 11:
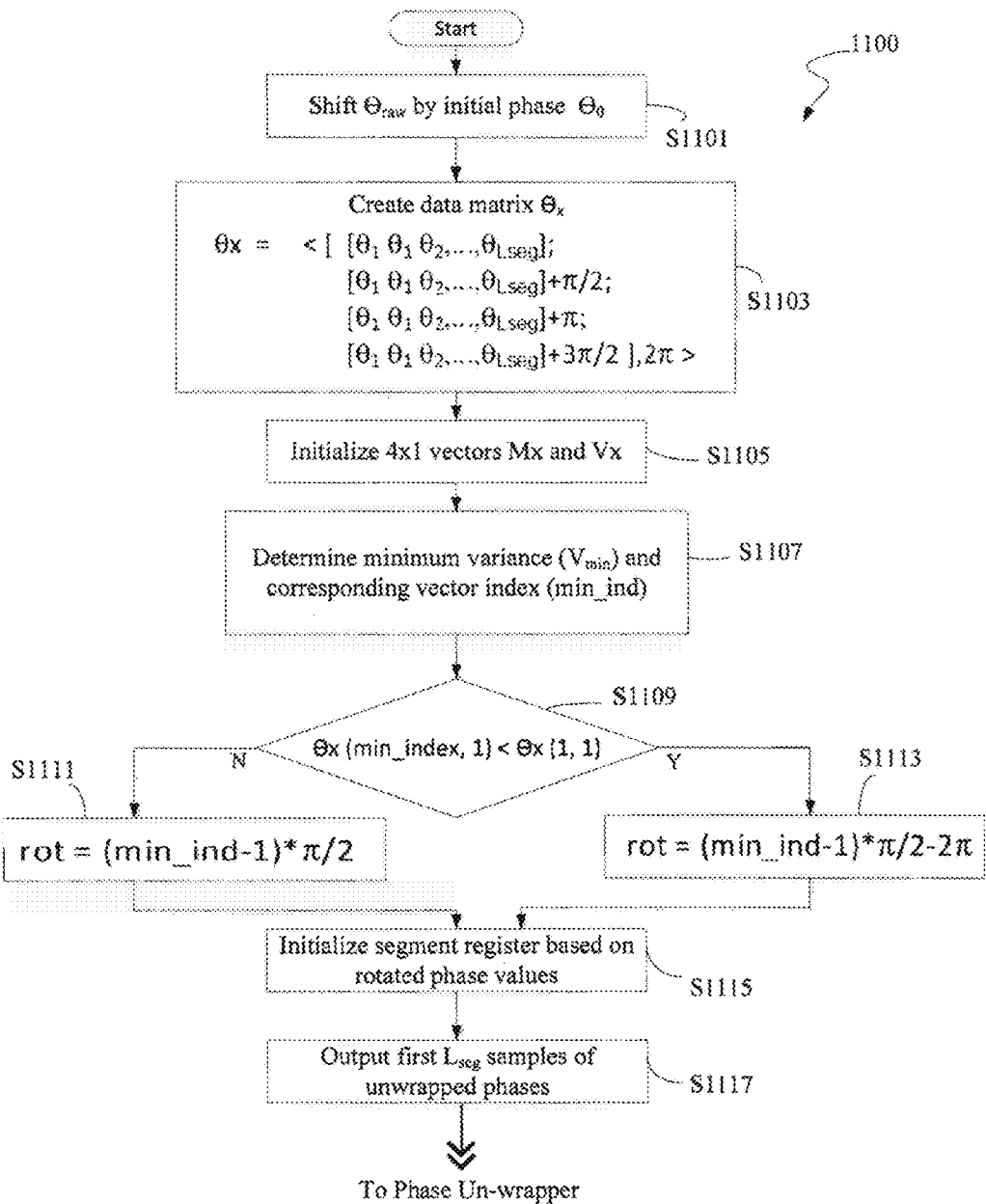
FIG. 11 depicts an exemplary flowchart outlining the steps performed in an initialization process by the phase unwrapper.

FIG. 11 depicts an exemplary flowchart outlining the steps performed in an initialization process on the phase unwrapper. The steps described herein may be performed by circuitry (described later with reference to FIG. 18) embedded within the demodulator of FIG. 2. The steps may alternatively be implemented by a programmed processor included in the demodulator of FIG. 2.

The process commences in step S1101, wherein input phase samples ($\theta_{raw}$) that are read from a pilot buffer are shifted by an initial phase of $\theta_0$. Specifically, a modulo 2Π operation on the shifted phase is computed (i.e., <($\theta_{raw}-\theta_0$), 2Π> is computed). Note that the original wrapped phases are shifted to start from approximately 0°, so as to ensure that the phase wrap operation occurs infrequently.

The process then proceeds to step S1103, wherein a data matrix $\theta_x$ is generated that has four rows. Each row of matrix $\theta_x$ has $L_{seg}+1$ samples wherein, each sample is an estimated phase of a pilot block that is to be used for variance calculation of the most recent segment for one of the four trials. As shown in FIG. 11, the four trials include segments that are offset by 0, π/2, π, and 3π/2 respectively, that correspond to the first, second, third, and fourth rows respectively, of the data matrix $\theta_x$.

In step S1105, two 4×1 vectors are initialized that respectively store the computed mean and variance values of the corresponding rows of $\theta_x$.

Based on computed variance values in step S1105, a minimum variance value and a corresponding row index (that has the smallest variance) is determined in step S1107.

The process then proceeds to step S1109, wherein a query is made to determine whether a first phase value stored in the row of data matrix having the smallest variance is lower than a first phase value stored in the first row of the data matrix. If the response to the query is negative, the process moves to step S1111.

In step S1111, a rotation value (depicted by variable 'rot') is computed as follows: (min_ind−1)*π/2, wherein the parameter min_ind corresponds to the row index of the data matrix that has the smallest variance. The process thereafter proceeds to step S1115.

However, if the response to the query (of step S1109) is affirmative, the process moves to step S1113, wherein the rotation value (rot) is computed as follows: (min_ind −1)*π/2−2π. The process thereafter proceeds to step S1115.

The process in step S1115 initializes a segment register to hold a first $L_{seg}$ number of unwrapped phase values. Specifically, the first $L_{seg}$ unwrapped phase values correspond to the phase values stored in the row of the data matrix $\theta_x$ having the minimum variance, from which a rotation value (rot, which is computed in either step S1111 or step S1113) is subtracted.

In step S1117, the first $L_{seg}$ number of unwrapped phase values are output, whereafter the process proceeds to unwrap the next phase sample as described next with reference to FIG. 12.

Figure 12:
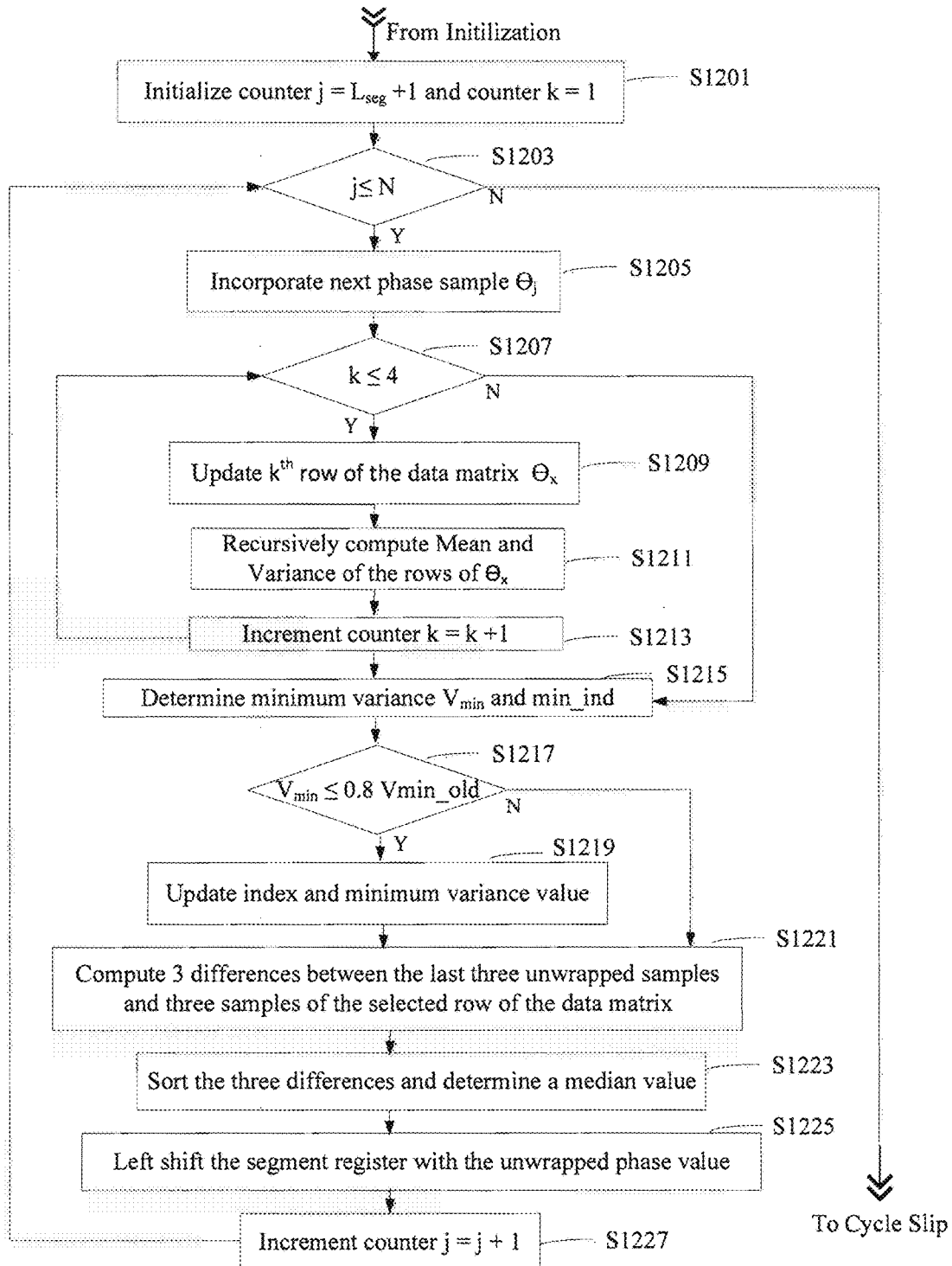
FIG. 12 depicts according to an embodiment, a flowchart depicting the steps performed in unwrapping phase samples.

FIG. 12 depicts according to an embodiment, a flowchart depicting the steps performed in unwrapping phase samples. Upon completing the initialization process as depicted in FIG. 11, the unwrapping process of FIG. 12 commences in step S1201, wherein a counter j is initialized to a value of $L_{seg}+1$ and a counter k is initialized to value of one.

In step S1203, a query is made to determine whether the value of counter j is less than equal to N. The parameter N corresponds to the total number of phase samples in an incoming signal, which by one embodiment is equal to the number of pilot-blocks in the burst signal. If the response to the query is affirmative, the process proceeds to step S1205. If the response to the query is negative, the process of unwrapping terminates and proceeds to perform cycle-slip corrections of the unwrapped phases (described later with reference to FIG. 13A).

In step S1205, the next phase sample $\theta_j$ is taken into account for phase unwrapping.

In step S1207, a query is made to determine whether the value of the counter k is less than four. If the response is negative, the process moves to step S1215. If the response to the query is affirmative, the process moves to step S1209.

In step S1209, the $k^{th}$ row of the data matrix $\theta_x$ is updated based on the new sample θj. Specifically, the operation <$\theta_j+(k-1)*\pi/2$, 2π> is performed. Further, the process in step S1211 computes in a recursive manner, the mean and variance of the $k^{th}$ row of the data matrix $\theta_x$. By one embodiment, equations (21)-(24) as described previously with reference to FIG. 9 may be utilized to perform the required computations.

The process then proceeds to step S1213, wherein the value of the counter k is incremented by one. Thereafter, the process loops back to step S1207.

Upon the query of step S1207 being negative, the process in step S1215 determines the row of the data matrix $\theta_x$ that has the lowest variance ($V_{min}$). Additionally, a counter min_ind is initialized with the value of the index of the row that the smallest variance.

The process thereafter proceeds to step S1217, wherein a query is made to determine whether the magnitude of the smallest variance computed in step S1215 is smaller than a predetermined fraction of a previously computed minimum variance (i.e., the smallest variance computed prior to the present iteration). If the response to the query is negative the process proceeds to step S1221, else if the response to the query is affirmative, then the process proceeds to step S1219.

In step S1219, the value of minimum variance (as well as the corresponding row index) computed thus far is updated to the value of the variance determined in step S1215.

Referring to FIG. 9, note that the phase values on the selected trial branch (i.e., one of the tapped lines in 917) are range limited to [−π, +π). Accordingly, in order to append the current unwrapped phase value to the Unwrapped Segment Shift Register, a difference between the selected tapped line and the latest 3 values in the unwrapped Segment Shift Register needs to be computed. According to an embodiment, in order to avoid an error due to outliers (as is the case when a single point difference is utilized), a 3-point difference is calculated in step S1221. Specifically, in step S1221, three differences between the last three unwrapped phase samples and three samples of the selected row of the data matrix $\theta_x$ are computed.

Further, in step S1223 the computed differences of step S1221 are sorted and a median value of the three computed differences is determined. The median value of the differences corresponds to the rotation value that is to be subtracted from the phase sample.

The process further proceeds to step S1225, wherein a left shift operation is performed on the segment register storing a predetermined number of prior phase unwrapped samples. Thus, the segment register may accommodate in its rightmost position, the value of the latest phase unwrapped sample (i.e., the value of the phase sample minus the rotation value that is computed in step S1223). Further, the process proceeds to step S1227 wherein the value of the counter j is incremented by one. Thereafter, the process loops back to step S1203 and repeats the above process for the next phase sample.

The above described technique of phase unwrapping may be subject to phase jumps of +/−2π or multiples of +/−2π (referred to herein as cycle-slips) in low SNR conditions.

Accordingly, by one embodiment of the present disclosure is described a cycle slip filter that is used to reduce cycle-slip effects.

FIG. 13A depicts an exemplary flowchart illustrating the steps performed by a cycle-slip filter.

The process commences in step S1301, wherein a cycle-slip offset parameter and a counter i are initialized. Specifically, the cycle-slip offset parameter (referred to herein as simply the offset parameter is initialized to a value of zero, whereas the counter 'i' is initialized to a value of $L_{seg}+1$.

In step S1303 a query is made to determine whether the value of the counter i is less than equal to N (total number of phase samples). If the response to the query is negative, the process of correcting cycle-slip errors simply terminates, and the process of determining outliers (described later with reference to FIG. 14A) in the phase trajectory of the burst signal is initiated. However, if the response to the query is affirmative, then the process proceeds to step S1305.

In step S1305, a moving average (denoted as M5) is computed of a predetermined number of unwrapped phase samples that are calculated a predetermined number of samples earlier than a current phase sample under consideration. For instance, a moving average is calculated of four unwrapped phase samples that are computed five samples prior to the current phase sample under consideration.

The process then proceeds to step S1307, wherein two differences labelled diff0 and diff1, respectively, are computed. By one embodiment, the difference diff0 is computed as: $\theta_{unwrapped}$ (i)−M5+offset, and the difference diff1 is computed as $\theta_{unwrapped}$ (i−2)−M5.

Further, in step S1309, a query is made to determine whether an absolute value of the difference, diff1 is greater than equal to $3\pi/2$. If the response to the query is affirmative, the process moves to step S1311, which corresponds to a cycle-slip occurring at phase location i. If the response to the query is negative, then the process moves to step S1313.

In step S1311, the parameter offset is updated as follows: offset=offset−sign (diff0)*2π, wherein the sign function is defined as sign(x)=1 if x>=0, and sign(x)=−1 if x<0. The process thereafter proceeds to step S1313.

In step S1313, a second query is made to determine whether an absolute value of the difference, diff1 is greater than equal to π. If the response to the query is affirmative, the process moves to step S1315, which corresponds to the scenario of the cycle-slop being detected at phase location i−2. However, if response to the query of step S1313 is negative, the process proceeds to S1317.

In step S1315, the value of the unwrapped phase at location 'i−2' ($\theta_{unwrapped}$ (i−2)) is updated as follows: $\theta_{unwrapped}$ (i−2)=$\theta_{unwrapped}$ (i−2)−sign (diff1)*2π. The process thereafter moves to step S1317.

In step S1317, the correct phase due to previous cycle-slips is computed as follows: $\theta_{unwrapped}$ (i)=$\theta_{unwrapped}$ (i)+offset, whereafter the process proceeds to step S1319. In step S1319, the value of the counter i is incremented by one, and the process loops back to step S1303 to repeat the above described process.

FIG. 13B depicts according to an embodiment of the present disclosure, an exemplary block diagram of a hardware implementation of a cycle-slip filter 1300.

As stated previously, the phase unwrapping process may be subject to phase jumps of +/−2π or multiples of +/−2π referred to as cycle-slips, in low SNR conditions. A cycle-slip filter can be used to reduce the cycle-slip effects.

The cycle-clip filter 1300 includes a pilot phase buffer 1350, an accumulator 1354, a moving average processing module 1352, and a plurality of computational modules such as a multiplexer 1364, comparators (1360, 1362), and sign function processing modules 1356 and 1358, respectively.

The pilot phase buffer 1350 stores the unwrapped phase values obtained from block 971 as depicted in FIG. 9. The unwrapped phase values (x(n)) 1371 are read from the pilot phase buffer 1350 and the cycle slip removed results (y(n)) 1372 are stored back to the buffer 1350 upon completion of the cycle-slip removal process as described in FIG. 13A.

Additionally, the cycle-clip filter 1300 includes a moving average processing module 1352 that is configured to perform the functions depicted in step S1305 of FIG. 13A. For instance, the moving average processing module may compute a moving average of four samples. The moving average processing module 1352 includes a plurality of adders such as 1353, and a plurality of delay elements such as 1355. The delay elements represented generally as "$z^{-k}$" perform a k-sample delay of an input sample. The moving average processing module 1352 computes a moving average of a predetermined number of unwrapped phase samples, which are calculated a predetermined number of samples earlier than a current phase sample under consideration. For instance, a moving average may be calculated of four unwrapped phase samples, which are computed five samples prior to the current phase sample under consideration.

The accumulator 1354 updates the cycle slip offset value. Specifically, the accumulator performs the functions depicted in step S1311 block in FIG. 13A. The processing block depicted as "sign" 1356 and 1358 are configured to output +1 if the input is greater than zero, and output −1 if the input is less than one. Additionally, the comparators 1360 and 1362 depicted in FIG. 13B as 'a>b', are configured to perform the following function: output 1 if "true" or 0 otherwise. The multiplexer 1364 (depicted as 'mux') outputs signal on port "1" if its control signal is logic "1", else the mux outputs the signal of port 0, based on the control being logic "0".

Figure 14A:
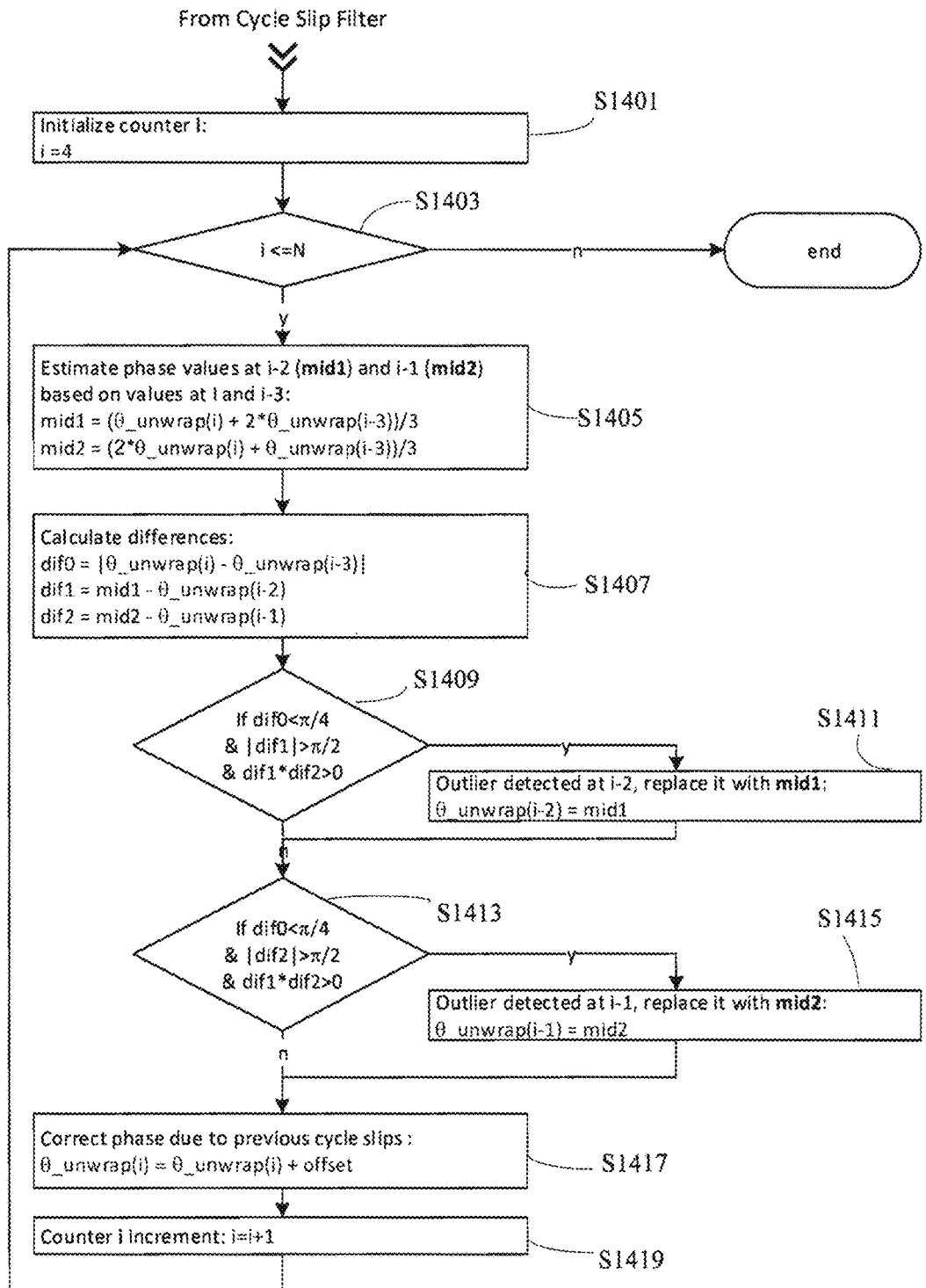
FIG. 14A depicts an exemplary flowchart illustrating the steps performed by an outlier filter.

The estimated raw phase values are also subject to outliers in low SNR conditions. Accordingly, by one embodiment of the present disclosure is provided an outlier filter that is designed to remove outstanding outliers. FIG. 14A depicts an exemplary flowchart illustrating the steps performed by an outlier filter.

The process begins in step S1401 wherein a counter i is assigned an initial value of 4. In step S1403, a query is made to determine whether the value of the counter i is less than equal to N (total number of phase samples to be processed). If the response to the query is negative the process terminates. If the response to the query is affirmative, the process proceeds to step S1405.

In step S1405, the phase values at locations i−2 and i−1 are estimated based on the phase values at locations i and i−3. Specifically the phase value at location i−2 (referred to herein as mid1) is estimated as follows:

$$\text{mid1}=(\theta_{unwrapped}(i)+2*\theta_{unwrapped}(i-3))/3, \quad (25)$$

and the phase value at location i−1 (referred to herein as mid2) is estimated as follows:

$$\text{mid2}==(2*\theta_{unwrapped}(i)+\theta_{unwrapped}(i-3))/3, \quad (26)$$

The process then proceeds to step S1407 wherein a set of three differences are computed. A first difference (labelled as dif0) is computed as the absolute value of a difference of the unwrapped phase values at locations i and i−3. Specifically, dif0 is computed as $|\theta_{unwrapped}(i)-\theta_{unwrapped}(i-3)|$. Further, a second difference (dif1) is computed as a difference between the estimated phase value at location i−2 and unwrapped phase value at location i−2, as follows:

dif1=mid1−θ$_{unwrapped}$ (i−2), and a third difference (dif2) is computed as a difference between the estimated phase value at location i−1 and unwrapped phase value at location i−1, as follows: dif2=mid2−θ$_{unwrapped}$ (i−1).

Thereafter, the process moves to step S1409, wherein a query is made to determine whether the computes differences are greater (or lower) than predetermined threshold values. Specifically, a query is made to determine whether dif0 is less than π/4, and |dif1| is greater than π/2, and dif1*dif2 is greater than 0. If the response to the query is affirmative, the process moves to step S1411. If the response to the query is negative, the process moves to step S1413.

In step S1411, a phase outlier is detected at location i−2, and the unwrapped phase value at location i−2 (i.e., θ$_{unwrapped}$ (i−2)) is replaced with the value of the estimated phase (computed in step S1405) at location i−2, i.e., θ$_{unwrapped}$ (i−2) is assigned the value of mid1. The process thereafter moves to step S1413.

In step S1413, another query is made to determine whether the computes differences are greater (or lower) than predetermined threshold values. Specifically, a query is made to determine whether dif0 is less than π/4, and |dif2| is greater than π/2, and dif1*dif2 is greater than 0. If the response to the query is affirmative, the process moves to step S1415. However, if the response to the query is negative, the process moves to step S1417.

In step S1415, a phase outlier is detected at location i−1, and the unwrapped phase value at location i−1 (i.e., θ$_{unwrapped}$ (i−1)) is replaced with the value of the estimated phase (computed in step S1405) at location i−1, i.e., θ$_{unwrapped}$ (i−1) is assigned the value of mid2. The process thereafter moves to step S1417.

The process in step S1417 corrects the phase due to previous occurrences of cycle-slips. Specifically, the offset that is computed in FIG. 13A is used to correct the phase as follows: θ$_{unwrapped}$ (i)=θ$_{unwrapped}$ (i)+offset, whereafter the process proceeds to step S1419. In step S1419, the value of the counter i is incremented by one, and the process loops back to step S1403 to repeat the above described process.

Figure 14B:
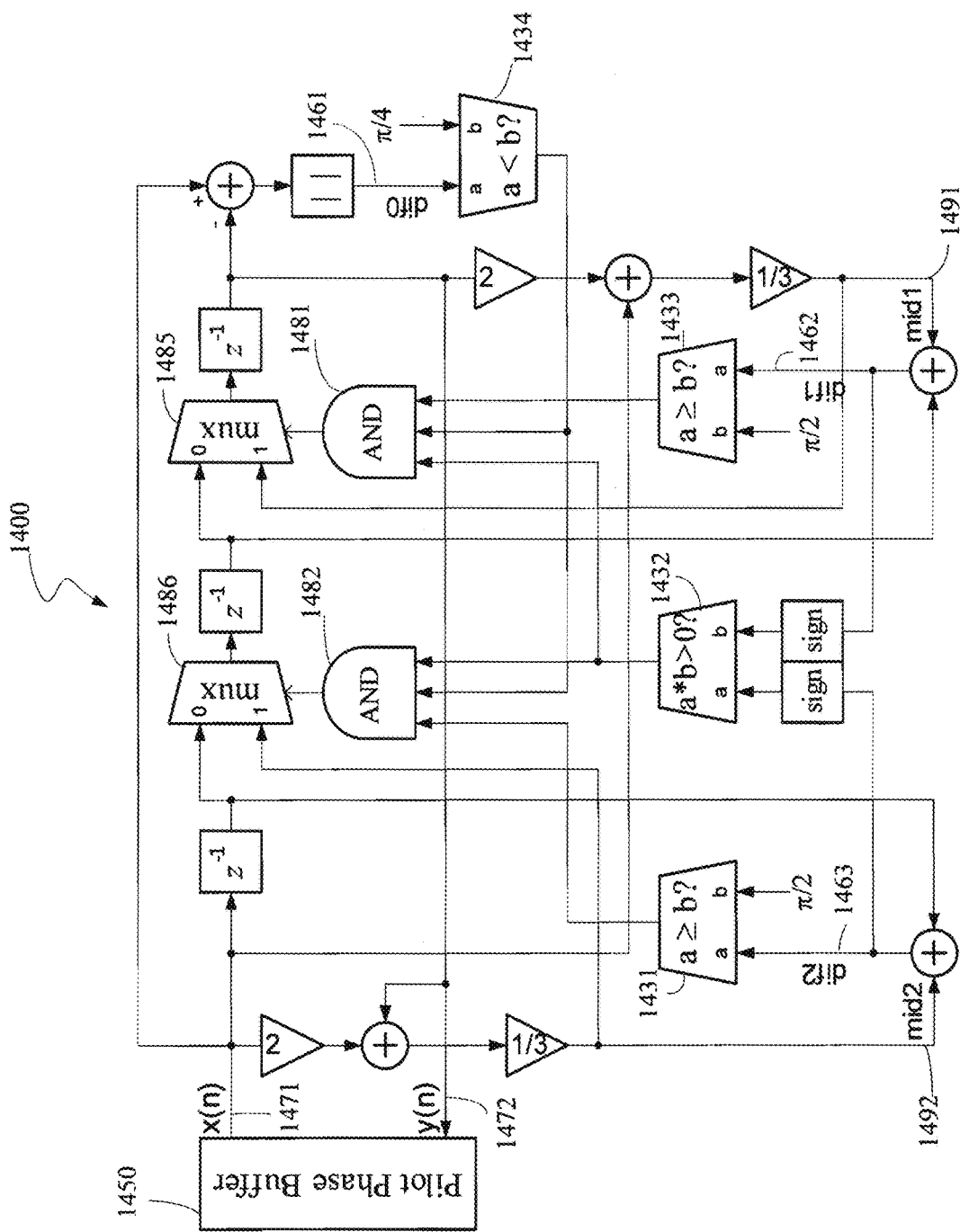
FIG. 14B depicts an exemplary block diagram of the outlier filter.

As stated previously, the estimated raw phase values may also be subject to outliers, especially in low SNR conditions. Accordingly, by an embodiment of the present disclosure is provided an outlier filter that is designed to remove outstanding outliers. FIG. 14B depicts an exemplary outlier filter 1400.

The outlier filter includes a pilot phase buffer 1450 that stores the cycle slip removed phase values x(n) 1471. The phase values which are corrected for potential outliers y(n) 1472 are stored back into the pilot buffer 1450.

The samples x(n) 1471 are read from the pilot buffer 1450 and two mid values, mid1 (1491) and mid2 (1492) that lie between a sample x(n−3) and x(n) are sequentially computed as shown in step S1405 of FIG. 14A. Furthermore, as depicted in step S1406 of FIG. 14A, the three differences (dif0 (1461), dif1 (1462), and dif2 (1463)) are computed.

The outlier 1400 includes four comparators 1431-1434 that are employed to generate the conditions depicted in step S1409 and S1413, respectively of FIG. 14A. Consequently, the AND gates 1481 and 1482 are used to perform a 'logical and' operation on the respective three inputs. If the AND condition as depicted in step S1409 of FIG. 14A is true, then the multiplexer 1485 outputs a signal sample on port "1", which is the mid1 value 1491, in order to replace the detected outlier that is present on port "0" of the multiplexer 1485. In a similar manner if the AND condition as depicted in step S1413 of FIG. 14A is true, then the multiplexer 1486 outputs signal sample on port "1", which is the mid2 value 1492, in order to replace the detected outlier that is present on port "0" of the multiplexer 1486. In such a manner, the outlier filter 1400 corrects for phase outliers that may lie in a phase trajectory of a burst signal.

According to an embodiment of the present disclosure, the performance of the demodulator (as described in FIG. 2) is based on successfully detecting a received signal. Typically, for burst detection, the demodulator compares the differential correlation result of the incoming signal to a predetermined threshold. Ideally, the threshold should be chosen such that both, the probability of detection and probability of false alarm are well below their target levels. If a threshold cannot maintain both, the detection and false alarm probabilities within their respective target levels, one can compromise, one of the probabilities, based on a cost of the compromise. For burst detection, the cost of false detection is usually less than the cost of miss (because a false detected burst will almost certainly fail burst CRC check), therefore the probability of false alarm is usually compromised more. For example, if the ideal targets are Pfalse=1e−4 and Pmiss=1e−4, we can choose threshold=0.02 for Aperture Window=12 chips (1510a and 1510b). If Aperture Window=260416 chips (1530a and 1530b), we may choose threshold=0.025 so that Pmiss=4.7e−4 and Pfalse=3.8−3. The threshold may be a function of both, the probability of detection and the probability of false alarm.

Figure 15:
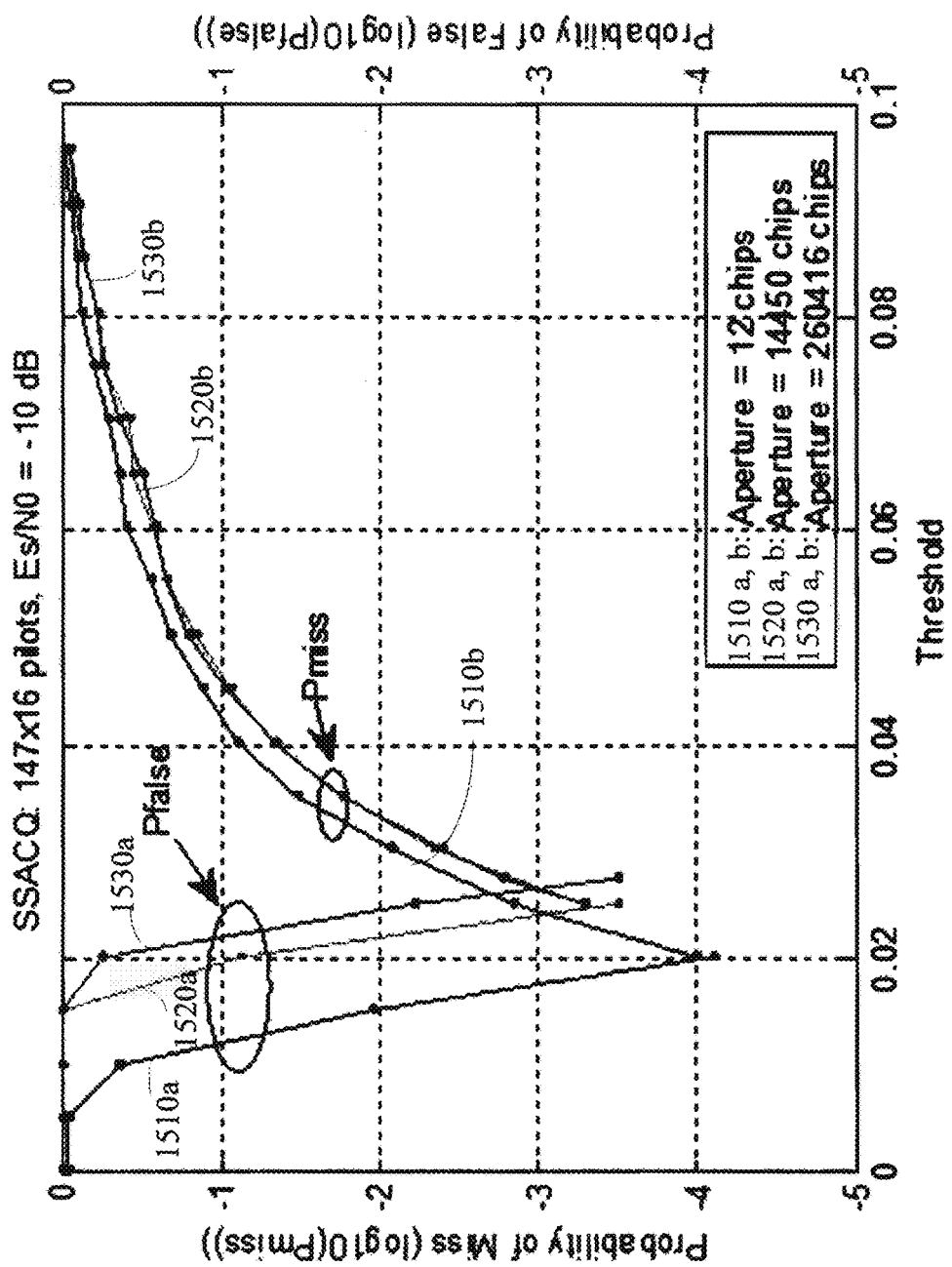
FIG. 15 illustrates a graph depicting the performance of burst detection.

FIG. 15 is a graph of the performance of detection of a spread spectrum burst signal for three different aperture sizes at an SNR threshold point of −10 dB. Specifically, the graph in FIG. 15 depicts the probability of miss and probability of false alarms plotted for different threshold values. Note that the probability of miss and probability of false alarms are plotted on a logarithmic scale in FIG. 15.

In FIG. 15, the curves 1510a, 1520a, and 1530a correspond to the probabilities of false alarms for aperture sizes of 12 chips, 14450 chips, and 260416 chips, respectively, while the curves 1510b, 1520b, and 1530b correspond to the probabilities of miss for the aperture sizes of 12 chips, 14450 chips, and 260416 chips, respectively. It can be observed from FIG. 15, that the equal probability point in the worse-case aperture size is $P_{miss}=P_{false}=1e-3$, at the normalized threshold of 0.0263. Additionally, at this point, the final probability of false assertion after CRC check is 1e−3/2^24=6e−11.

Figure 16:
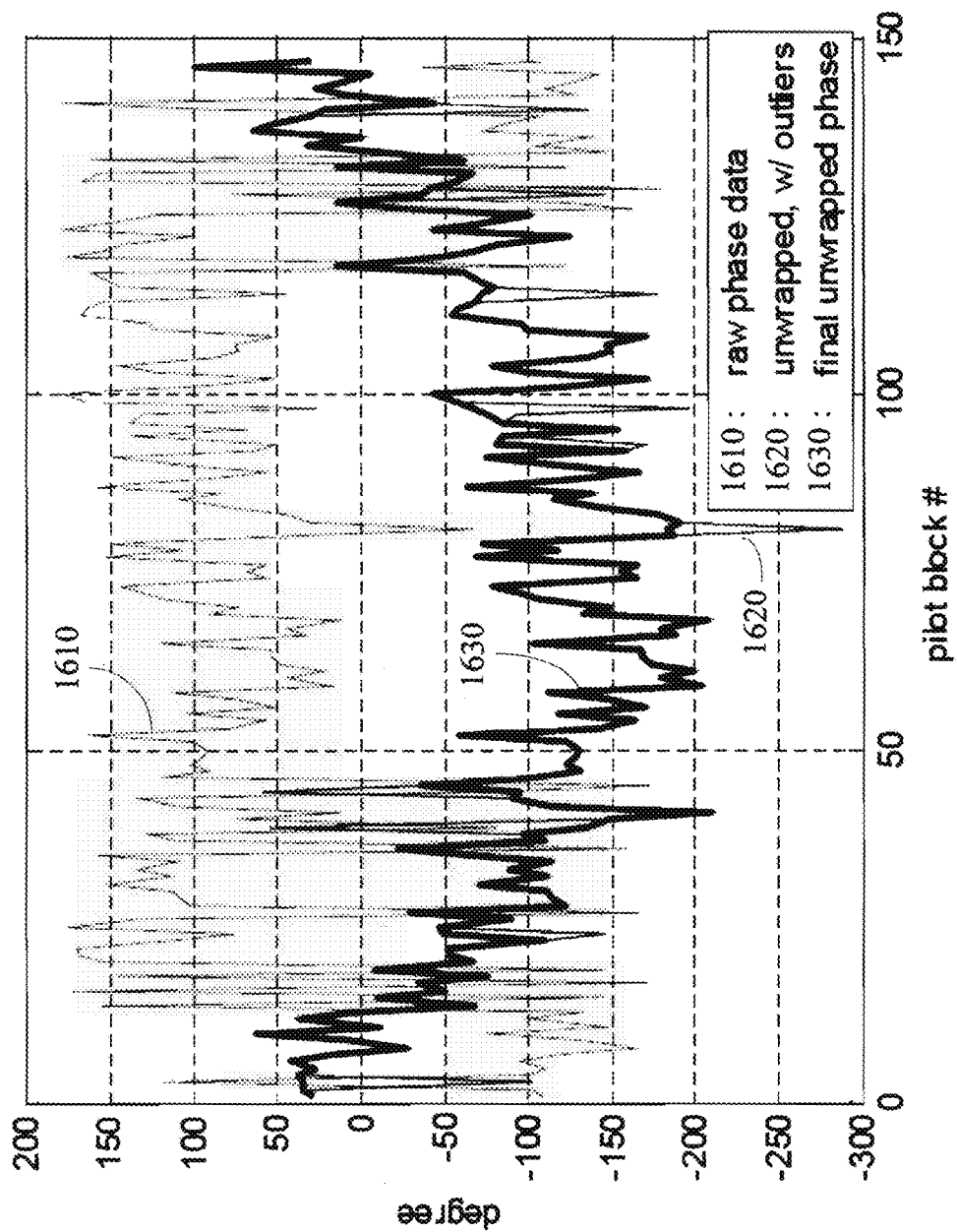
FIG. 16 depicts a graph illustrating a performance of a phase unwrapper, according to an embodiment.
Figure 17:
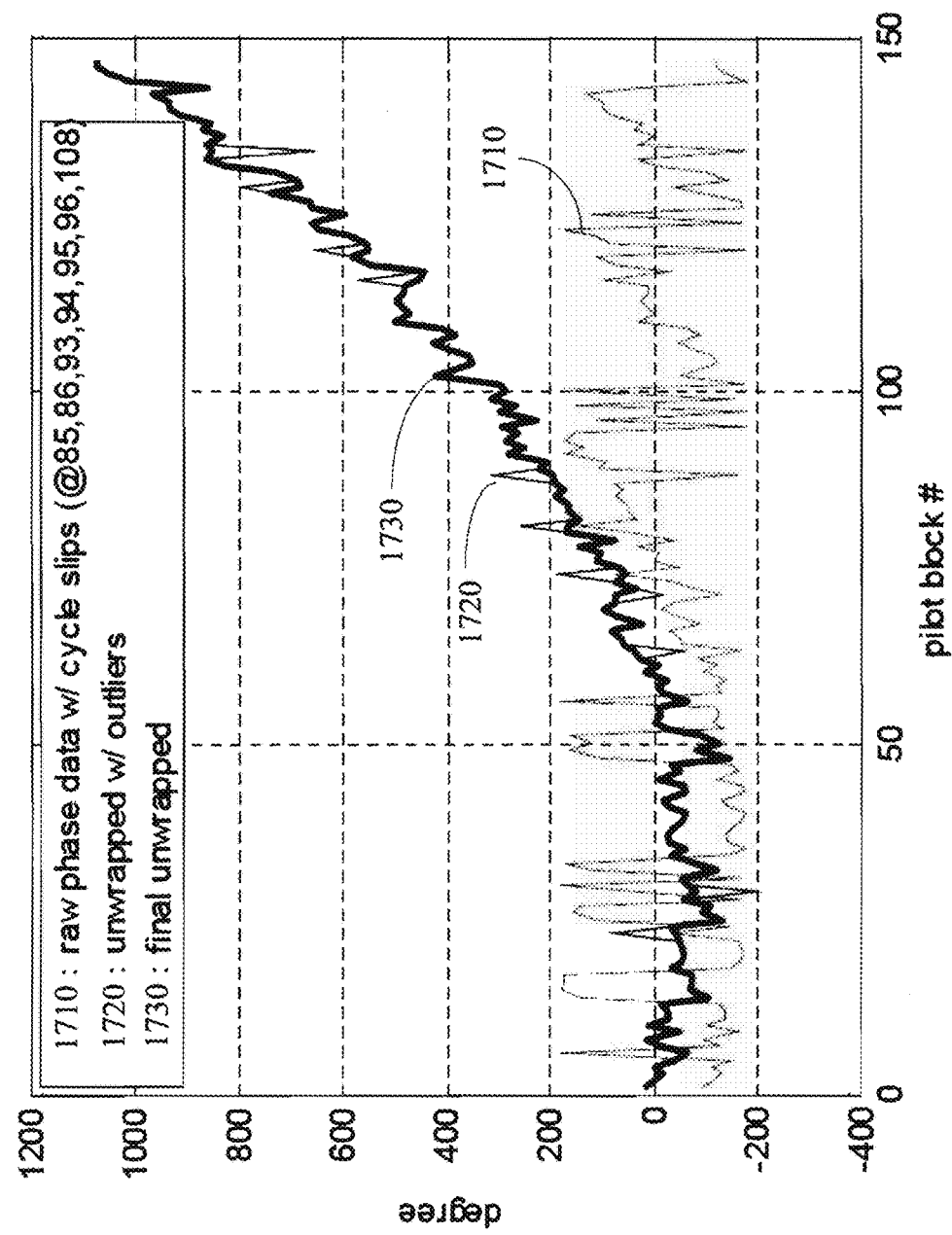
FIG. 17 depicts a graph illustrating a performance of the phase unwrapper, according to one embodiment.

FIGS. 16 and 17 depict, according to an embodiment, graphs illustrating a performance of the phase unwrapper of the present disclosure. In FIGS. 16 and 17, the phase values are plotted on the Y-axis and the pilot-block indexes are plotted on the X-axis. FIG. 16 depicts the performance of phase unwrapping of noisy data including a Doppler drift. In FIG. 16, the curve 1610 corresponds to a raw phase data that fluctuates vastly. The curve 1620 depicts a curve corresponding to unwrapped data that includes outliers. Upon correcting for outliers, the performance of the unwrapped signal is as depicted in FIG. 16 as curve 1630. It must be appreciated that the magnitude in terms of degrees over which the curve 1630 varies considerably smaller that the corresponding magnitude of raw phase data.

In a similar manner, FIG. 17 depicts a curve 1710 that corresponds to the phase of raw data including cycle slips at predetermined locations. The curve 1720 corresponds to the phase of a demodulated signal that is phase-unwrapped but includes outliers, whereas the curve 1730 corresponds to a fully corrected (i.e., cycle slips and outlier removed) phase trajectory.

Each of the functions of the above described embodiments may be implemented by one or more processing circuits. A processing circuit includes a programmed processor (for example, processor 1803 in FIG. 18), and a processor includes circuitry. A processing circuit also includes devices such as an application-specific integrated circuit (ASIC), FPGA's, and circuit components that are arranged to perform the recited functions.

Figure 18:
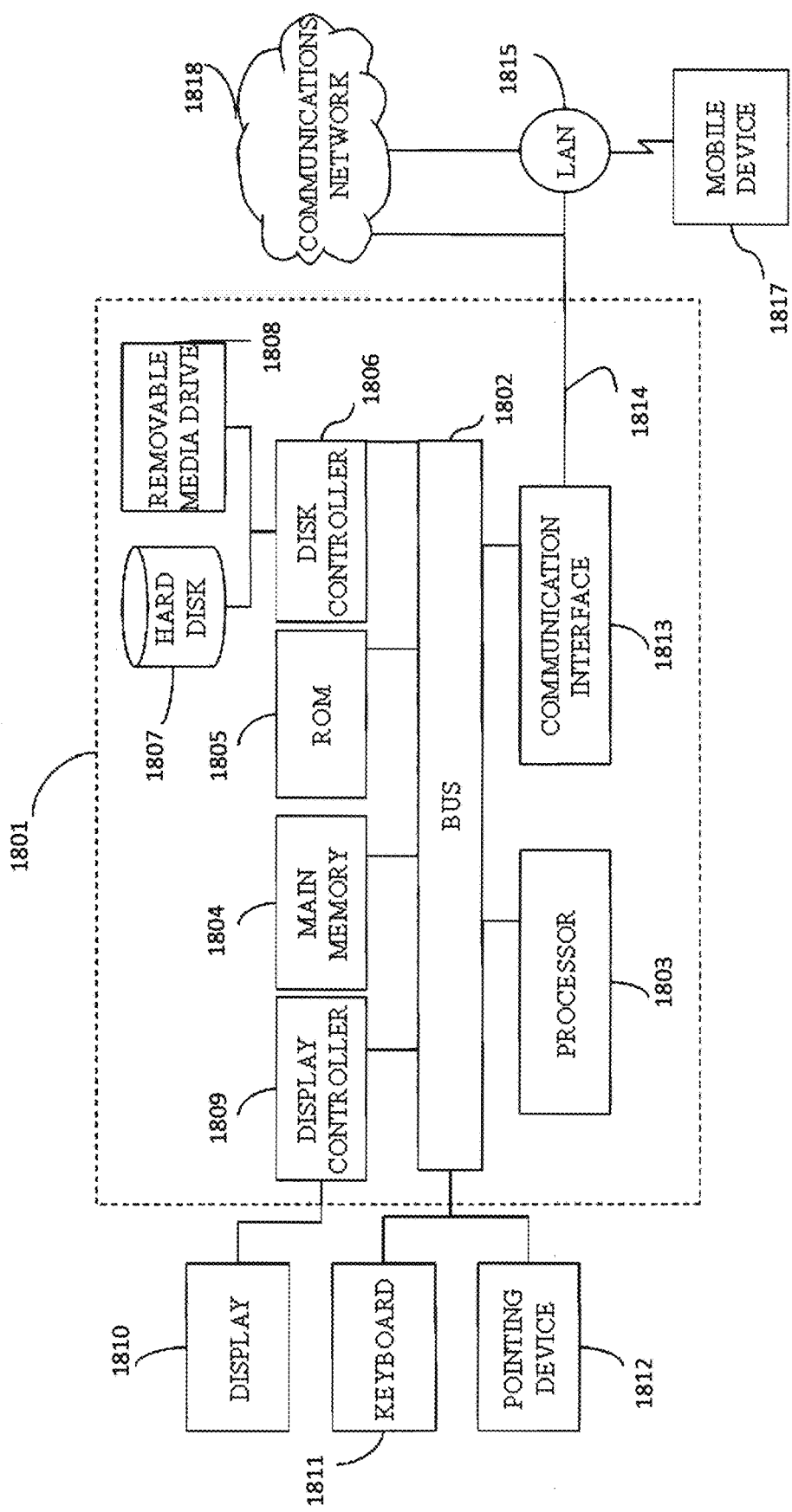
FIG. 18 illustrates a block diagram of a computing device according to one embodiment.

One or more of the various features discussed above may be implemented by a computer system (or programmable logic). FIG. 18 illustrates such a computer system 1801. In one embodiment, the computer system 1801 is a particular, special-purpose machine when the processor 1803 is programmed to perform the functions of demodulating a spread spectrum TDMA burst signal as described above. For instance, the circuitry included on the computer system of FIG. 18 may be configured to perform the functions of differential correlation, ambiguity estimation of phase/frequency of the burst signal, phase unwrapping of the burst signal, and other computations described herein. Specifically, the various processing modules included in the demodulator may be, by one embodiment, realized by circuitry included on a computer system as described herein.

The computer system 1801 includes a disk controller 1806 coupled to the bus 1802 to control one or more storage devices for storing information and instructions, such as a magnetic hard disk 1807, and a removable media drive 1808 (e.g., floppy disk drive, read-only compact disc drive, read/write compact disc drive, compact disc jukebox, tape drive, and removable magneto-optical drive). The storage devices may be added to the computer system 1801 using an appropriate device interface (e.g., small computer system interface (SCSI), integrated device electronics (IDE), enhanced-IDE (E-IDE), direct memory access (DMA), or ultra-DMA).

The computer system 1801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1801 may also include a display controller 1809 coupled to the bus 1802 to control a display 1810, for displaying information to a computer user. The computer system includes input devices, such as a keyboard 1811 and a pointing device 1812, for interacting with a computer user and providing information to the processor 1803. The pointing device 1812, for example, may be a mouse, a trackball, a finger for a touch screen sensor, or a pointing stick for communicating direction information and command selections to the processor 1803 and for controlling cursor movement on the display 1810.

The processor 1803 executes one or more sequences of one or more instructions contained in a memory, such as the main memory 1804. Such instructions may be read into the main memory 1804 from another computer readable medium, such as a hard disk 1807 or a removable media drive 1808. One or more processors in a multi-processing arrangement may also be employed to execute the sequences of instructions contained in main memory 1804. In alternative embodiments, hard-wired circuitry may be used in place of or in combination with software instructions. Thus, embodiments are not limited to any specific combination of hardware circuitry and software.

As stated above, the computer system 1801 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1801, for driving a device or devices for implementing the features of the present disclosure, and for enabling the computer system 1801 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1803 for execution. A computer readable medium may take many forms, including but not limited to, non-volatile media or volatile media. Non-volatile media includes, for example, optical, magnetic disks, and magneto-optical disks, such as the hard disk 1807 or the removable media drive 1808. Volatile media includes dynamic memory, such as the main memory 1804. Transmission media, on the contrary, includes coaxial cables, copper wire and fiber optics, including the wires that make up the bus 1802. Transmission media also may also take the form of acoustic or light waves, such as those generated during radio wave and infrared data communications.

Various forms of computer readable media may be involved in carrying out one or more sequences of one or more instructions to processor 1803 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1801 may receive the data on the telephone line and place the data on the bus 902. The bus 902 carries the data to the main memory 1804, from which the processor 1803 retrieves and executes the instructions. The instructions received by the main memory 1804 may optionally be stored on storage device 1807 or 1808 either before or after execution by processor 1803.

The computer system 1801 also includes a communication interface 1813 coupled to the bus 1802. The communication interface 1813 provides a two-way data communication coupling to a network link 1814 that is connected to, for example, a local area network (LAN) 1815, or to another communications network 1816 such as the Internet. For example, the communication interface 1813 may be a network interface card to attach to any packet switched LAN. As another example, the communication interface 1813 may be an integrated services digital network (ISDN) card. Wireless links may also be implemented. In any such implementation, the communication interface 1813 sends and receives electrical, electromagnetic or optical signals that carry digital data streams representing various types of information.

The network link 1814 typically provides data communication through one or more networks to other data devices. For example, the network link 1814 may provide a connection to another computer through a local network 1815 (e.g., a LAN) or through equipment operated by a service provider, which provides communication services through a communications network 1816. The local network 1814 and the communications network 1816 use, for example, electrical, electromagnetic, or optical signals that carry digital data streams, and the associated physical layer (e.g., CAT 5 cable, coaxial cable, optical fiber, etc.). The signals through the various networks and the signals on the network link 1814 and through the communication interface 1813, which carry the digital data to and from the computer system 1801 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1801 can transmit and receive data, including program code, through the network(s) 1815 and 1816, the network link 1814 and the communication interface 1813. Moreover, the network link 1814 may provide a connection through a LAN 1815 to a mobile device 1817 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

The invention claimed is:

1. A device for detecting a burst signal, the device comprising:
   circuitry configured to
      concatenate a predetermined number of samples and transmit the concatenated samples at a predetermined transmit rate to a first memory tap of a predetermined number of memory taps, each memory tap being programmable to delay each sample by an amount based on a length of a pilot-block of the burst signal and a length of a payload of the burst signal,
      compute, for each memory tap of the predetermined number of memory taps a corresponding partial correlation, the partial correlation for each memory tap including multiplying each of the concatenated samples with a corresponding pilot symbol included in a pilot block associated with a memory tap, the samples being transferred from the first memory tap to a subsequent memory tap after a time delay,
      compute for each memory tap, a sum of the partial correlations corresponding to every sample of the burst signal,
      normalize, for each memory tap, the computed sum of the partial correlations,
      multiplex, the normalized partial correlations of the memory taps to a predetermined number of multipliers, each multiplier calculating a complex conjugate multiplication of a pair of neighboring samples, and
      determine a peak of the burst signal by computing a summation of the complex multiplications of each multiplier, the determined peak corresponding to a start of the burst signal.

2. The device of claim 1, wherein the circuitry is further configured to sample the burst signal at a predetermined sampling rate of two samples per chip, each sample including an in-phase component and a quadrature phase component.

3. The device of claim 2, wherein the predetermined number of multipliers is lower than the number of memory taps included in the device, and wherein each multiplier processes the in-phase and the quadrature phase components in a time-shared manner.

4. The device of claim 1, wherein the concatenated samples are transmitted to the first memory tap at the predetermined transmit rate of every sixteen clock cycles of a clock signal, the clock signal having a frequency of 240 MHz, and wherein the burst signal is received by the device at a rate of 30 Mega-chips per second.

5. The device of claim 1, wherein the predetermined number of memory taps is equal to a number of pilot blocks included in the burst signal.

6. The device of claim 5, wherein each memory tap is configured to store at most a number of samples corresponding to a distance between consecutive pilot blocks of the burst signal.

7. The device of claim 6, wherein the number of pilot-blocks included in the burst signal is 144 pilot-blocks, the length of each pilot-block of the burst signal being in a range of 2 to 28 chips, and the distance between the consecutive pilot-blocks of the burst signal is in a range of 30 to 240 chips.

8. The device of claim 5, wherein the circuitry is further configured to perform for each sample of the burst signal, a first number of complex multiplication and addition operations corresponding to each partial correlation, the first number having a magnitude that is one lower than the number of pilot blocks included in the burst signal.

9. The device of claim 1, wherein each pilot-block of the burst signal is generated from a master PN sequence generator of length 32767 bits.

10. The device of claim 1, wherein the circuitry is configured to normalize the computed sum of the partial correlations by performing a right shift operation on the computed sum, the right shift operation having a magnitude that is a logarithmic value of the length of the pilot block.

11. A method of detecting a burst signal, the method being performed by circuitry and comprising:
   concatenating a predetermined number of samples and transmitting the concatenated samples at a predetermined transmit rate to a first memory tap of a predetermined number of memory taps, each memory tap being programmable to delay each sample by an amount based on a length of a pilot-block of the burst signal and a length of a payload of the burst signal;

computing by the circuitry, for each memory tap of the predetermined number of memory taps a corresponding partial correlation, the partial correlation for each memory tap including multiplying each of the concatenated samples with a corresponding pilot symbol included in a pilot block associated with a memory tap, the samples being transferred from the first memory tap to a subsequent memory tap after a time delay;

computing for each memory tap, a sum of the partial correlations corresponding to every sample of the burst signal;

normalizing by the circuitry, for each memory tap, the computed sum of the partial correlations;

multiplexing the normalized partial correlations of the memory taps to a predetermined number of multipliers, each multiplier calculating a complex conjugate multiplication of a pair of neighboring samples; and determining a peak of the burst signal by computing a summation of the complex multiplications of each multiplier, the determined peak corresponding to a start of the burst signal.

12. The method of claim 11, further comprising:
sampling the burst signal at a predetermined sampling rate of two samples per chip, each sample including an in-phase component and a quadrature phase component.

13. The method of claim 11, wherein the concatenated samples are transmitted to the first memory tap at the predetermined transmit rate of every sixteen clock cycles of a clock signal, the clock signal having a frequency of 240 MHz, and wherein the burst signal is received by the device at a rate of 30 Mega-chips per second.

14. The method of claim 11, wherein the predetermined number of memory taps is equal to a number of pilot blocks included in the burst signal, each memory tap being configured to store at most a number of samples corresponding to a distance between consecutive pilot blocks of the burst signal.

15. The method of claim 14, wherein the number of pilot-blocks included in the burst signal is 144 pilot-blocks, the length of each pilot-block of the burst signal being in a range of 2 to 28 chips, and the distance between the consecutive pilot-blocks of the burst signal is in a range of 30 to 240 chips.

16. The method of claim 14, further comprising:
performing, for each sample of the burst signal, a first number of complex multiplication and addition operations corresponding to each partial correlation, the first number having a magnitude that is one lower than the number of pilot blocks included in the burst signal.

17. The method of claim 11, wherein the normalizing of the computed sum of the partial correlations is obtained by performing a right shift operation on the computed sum, the right shift operation having a magnitude that is a logarithmic value of the length of the pilot block.

18. The method of claim 11, wherein each pilot-block of the burst signal is generated from a master PN sequence generator of length 32767 bits.

19. The method of claim 11, wherein the predetermined number of multipliers is lower than the number of memory taps included in the device, and wherein each multiplier processes the concatenated samples in a time-shared manner.

20. A non-transitory computer readable medium having stored thereon a program that when executed by a computer, causes the computer to execute a method of detecting a burst signal, the method comprising:

concatenating a predetermined number of samples and transmitting the concatenated samples at a predetermined transmit rate to a first memory tap of a predetermined number of memory taps, each memory tap being programmable to delay each sample by an amount based on a length of a pilot-block of the burst signal and a length of a payload of the burst signal;

computing, for each memory tap of the predetermined number of memory taps a corresponding partial correlation, the partial correlation for each memory tap including multiplying each of the concatenated samples with a corresponding pilot symbol included in a pilot block associated with a memory tap, the samples being transferred from the first memory tap to a subsequent memory tap after a time delay;

computing for each memory tap, a sum of the partial correlations corresponding to every sample of the burst signal;

normalizing, for each memory tap, the computed sum of the partial correlations;

multiplexing the normalized partial correlations of the memory taps to a predetermined number of multipliers, each multiplier calculating a complex conjugate multiplication of a pair of neighboring samples; and determining a peak of the burst signal by computing a summation of the complex multiplications of each multiplier, the determined peak corresponding to a start of the burst signal.

\* \* \* \* \*